(12) United States Patent
Watanabe et al.

(10) Patent No.: US 7,184,090 B2
(45) Date of Patent: Feb. 27, 2007

(54) CAMERA

(75) Inventors: Toshimi Watanabe, Yokohama (JP); Toshiaki Maeda, Yokohama (JP); Hideo Hibino, Yamato (JP); Tadashi Ohta, Yokohama (JP)

(73) Assignee: Nikon Corporation, Tokyo (JP)

( * ) Notice: Subject to any disclaimer, the term of this patent is extended or adjusted under 35 U.S.C. 154(b) by 766 days.

(21) Appl. No.: 10/254,866

(22) Filed: Sep. 26, 2002

(65) Prior Publication Data
US 2003/0063211 A1  Apr. 3, 2003

(30) Foreign Application Priority Data

| Sep. 28, 2001 | (JP) | ............................. 2001-302280 |
| Sep. 28, 2001 | (JP) | ............................. 2001-302281 |
| Sep. 28, 2001 | (JP) | ............................. 2001-302282 |
| Sep. 28, 2001 | (JP) | ............................. 2001-302388 |

(51) Int. Cl.
H04N 5/232 (2006.01)

(52) U.S. Cl. ..................... 348/349; 348/345; 348/348

(58) Field of Classification Search ............... 348/348, 348/333.03, 350, 349, 345; 396/51, 72, 79
See application file for complete search history.

(56) References Cited

U.S. PATENT DOCUMENTS

| 5,361,095 A | * | 11/1994 | Toshinobu et al. ........... 348/354 |
| 6,278,489 B1 | * | 8/2001 | Hirasawa ..................... 348/348 |
| 6,563,543 B1 | * | 5/2003 | Doron ......................... 348/362 |
| 2001/0028402 A1 | | 10/2001 | Sugimoto et al. |
| 2005/0083430 A1 | * | 4/2005 | Hirasawa et al. ............ 348/349 |

FOREIGN PATENT DOCUMENTS

| JP | A 4-329506 | 11/1992 |
| JP | A 6-62306 | 3/1994 |
| JP | A 6-86142 | 3/1994 |
| JP | B2 7-54971 | 6/1995 |
| JP | A 10-191140 | 7/1998 |
| JP | A 2001-255450 | 9/2001 |

* cited by examiner

Primary Examiner—Lin Ye
(74) Attorney, Agent, or Firm—Oliff & Berridge, PLC

(57) ABSTRACT

A camera includes: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a decision-making unit that makes a decision as to whether or not a predetermined length of time has elapsed following an end of the focusing operation; a restart unit that engages the focusing operation unit in a focusing operation if the decision-making unit decides that the predetermined length of time has elapsed; and a time adjustment unit that changes the predetermined length of time.

25 Claims, 22 Drawing Sheets

CAMERA

INCORPORATION BY REFERENCE

The disclosures of the following priority applications are herein incorporated by reference:

Japanese Patent Application No. 2001-302280 filed Sep. 28, 2001
Japanese Patent Application No. 2001-302281 filed Sep. 28, 2001
Japanese Patent Application No. 2001-302282 filed Sep. 28, 2001
Japanese Patent Application No. 2001-302388 filed Sep. 28, 2001

BACKGROUND OF THE INVENTION

1. Field of the Invention

The present invention relates to a camera that engages in a focusing operation through the contrast method by using an image-capturing signal provided by an image-capturing element.

2. Description of the Related Art

The AF methods adopted in cameras in the related art include the so-called contrast method. In the contrast method, an image of a subject is captured by an image-capturing element such as a CCD and the focus position is determined by using the image-capturing signal within the focus area. The image-capturing signal within the area are filtered through a band pass filter (BPF) and the components in the image-capturing signal that correspond to a predetermined spatial frequency band are extracted. Then, by integrating the absolute values of the extracted components within the area, a focus evaluation value to be used for the focusing operation is obtained. This focus evaluation value represents the contrast level, and the contrast is at its highest at the point at which the focus evaluation value peaks.

Namely, the peak position matches the focus position. The peak is ascertained by performing an operation which is known as a so-called hill-climbing (or scaling) focusing operation in the related art. In a continuous AF mode in which an AF operation is constantly performed regardless of whether or not the shutter release button is pressed halfway down, the hill-climbing focusing operation is executed over predetermined time intervals so as to set a focus on the subject at all times.

However, during the hill-climbing focusing operation, the focus evaluation value is calculated by driving the lens, a decision is made as to whether or not the focus evaluation value is the peak value and the same process is repeated if the focus evaluation value is not the peak value. When such a hill-climbing focusing operation is repeated frequently over the predetermined time interval, the battery becomes depleted quickly.

There is another problem with regard to the hill-climbing focusing operation in the related art in that when a relatively large change occurs in the subject, the misalignment between the lens position at the startup and the peak position becomes significant to result in a lengthy hill-climbing focusing operation.

In addition, it is desired that a focused picture can be photographed by performing the hill-climbing focusing operation described above while minimizing the battery power consumption.

SUMMARY OF INVENTION

The present invention provides a camera that engages in a focusing operation through the contrast method by using an image-capturing signal provided by an image-capturing element and achieves a reduction in battery power consumption when the focusing operation is restarted.

Also, the present invention provides a camera that engages in a focusing operation through the contrast method by using an image-capturing signal provided by an image-capturing element and is capable of taking a focused picture by setting a shutter release enabling condition separately from a restart condition for the focusing operation.

Furthermore, the present invention provides a camera that engages in a focusing operation through the contrast method by using an image-capturing signal provided by an image-capturing element and is capable of taking a focused picture by adjusting a restart condition for the focusing operation in conformance to whether or not a photographing preparation command indicating the intent to perform a photographing operation has been issued.

Yet furthermore, the present invention provides a camera that engages in a focusing operation through the contrast method by using an image-capturing signal provided by an image-capturing element and is capable of promptly executing a hill-climbing focusing operation when the focusing operation is restarted after focusing has been once completed.

The first camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a decision-making unit that makes a decision as to whether or not a predetermined length of time has elapsed following an end of the focusing operation; a restart unit that engages the focusing operation unit in a focusing operation if the decision-making unit decides that the predetermined length of time has elapsed; and a time adjustment unit that changes the predetermined length of time.

In this camera, it is preferred that: a determining unit that determines a time changing condition in conformance to which the predetermined length of time is changed by the time adjustment unit, is further provided; and the time adjustment unit changes the predetermined length of time in conformance to the time changing condition determined by the determining unit. In this case, it is preferred that: an evaluation value detection unit that detects whether or not a focus evaluation value calculated after a focusing operation end manifests a change by an extent larger than a predetermined value relative to a focus evaluation value obtained at the focus operation end, is further provided; and the restart unit enables the focusing operation unit in the focusing operation either when the decision-making unit decides that the predetermined length of time has elapsed or when the evaluation value detection unit detects the change by the extent larger than the predetermined value, whichever occurs first.

Another camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a decision-making unit that makes a decision as to whether or not a focus evaluation value calculated by the evaluation value calculation unit after a focusing operation end manifests a change by an extent larger than a predetermined value relative to a focus evaluation value calculated at the focusing operation end over an interval matching a predetermined length of time; a restart unit that enables the focusing operation unit in a focusing operation when the decision-making unit decides that the change by the extent larger than the predetermined value has occurred; and a time adjustment unit that changes the predetermined length of time.

In this camera, it is preferred that: a determining unit that determines a time changing condition in conformance to which the predetermined length of time is changed by the time adjustment unit, is further provided; and the time adjustment unit changes the predetermined length of time in conformance to the time changing condition determined by the determining unit.

In the above first camera, it is preferred that: a timer that starts a time count upon completion of an initial focusing operation, is further provided; and the determining unit determines the time changing condition so as to lengthen the predetermined length of time after a specific time count is counted at the timer compared to the predetermined length of time before the specific time count is counted at the timer.

Also, it is preferred that the determining unit determines the time changing condition so as to set the predetermined length of time in correspondence to a photographing condition or a camera state.

In this case, it is preferred that: the photographing condition is a focal length of the photographic lens; and the determining unit determines the time changing condition so as to lengthen the predetermined length of time as the focal length increases.

Also, it is preferred that: the photographing condition includes a first photographing mode suited for photographing a subject that moves slightly or almost not at all and a second photographing mode suited for photographing a subject that moves faster than the subject in the first photographing mode; and the determining unit determines the time changing condition so as to shorten the predetermined length of time in the second photographing mode compared to the predetermined length of time set in the first photographing mode. In this case, it is preferred that the first photographing mode includes at least one of a normal photographing mode, a distant view photographing mode, a portrait photographing mode, a close-up photographing mode and a night photographing mode and the second photographing mode includes at least a sports photographing mode.

Also, it is preferred that: an aperture that is operated to adjust a quantity of subject light entering the image-capturing element, is further provided; and an aperture value set at the aperture constitutes the photographing condition; and the determining unit determines the time changing condition so as to lengthen the predetermined length of time as the aperture value increases.

Also, it is preferred that: a photometering unit that detects a brightness of a predetermined area of the subject is further provide; the brightness detected by the photometering unit constitutes the photographing condition; and the determining unit determines the time changing condition so as to lengthen the predetermined length of time as the brightness becomes lower.

Also, it is preferred that: the image-capturing element includes a plurality of pixels; a number of recording pixels to be used for recording in data of the image captured by the image-capturing element can be varied; the number of recording pixels constitutes the photographing condition; and the determining unit determines the time changing condition so as to lengthen the predetermined length of time as the number of recording pixels becomes smaller.

Also, it is preferred that: a full-aperture F value detection unit that detects a full-aperture F value of the photographic lens constituting the photographing condition, is further provided; and the determining unit determines the time changing condition so as to lengthen the predetermined length of time as a larger full-aperture F value is detected.

Also, it is preferred that: a voltage detection unit that detects a voltage of a camera drive battery constituting the camera state, is further provided; and the determining unit determines the time changing condition so as to lengthen the predetermined length of time as the voltage detected by the voltage detection unit becomes lower.

Another camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a restart unit that engages the focusing operation unit in a focusing operation if the focus evaluation value calculated after an end of the focusing operation manifests a change by an extent larger than a predetermined reference change quantity relative to the focus evaluation value calculated at the end of the focusing operation; and a setting unit that sets the predetermined reference change quantity in conformance to a predetermined condition.

In this camera, it is preferred that: the restart unit engages the focusing operation unit in the focusing operation if the focus evaluation value calculated after the end of the focusing operation manifests the change by the extent larger than the predetermined reference change quantity relative to the focus evaluation value calculated at the end of the focusing operation, in an increasing or decreasing direction.

Also, it is preferred that the restart unit engages the focusing operation unit in the focusing operation only if the focus evaluation value calculated after the end of the focusing operation manifests the change by the extent larger than a predetermined reference change quantity relative to the focus evaluation value calculated at the end of the focusing operation, in a decreasing direction.

Also, it is preferred that: a selection unit that selects either a first photographing mode suited for photographing a subject that moves slightly or almost not at all or a second photographing mode suited for photographing a subject that moves fast, is further provided; and the setting unit sets a smaller value for the predetermined reference change quantity when the second photographing mode is selected by the selection unit than a value set when the first photographing mode is selected by the selection unit. In this case, it is preferred that the first photographing mode includes at least one of a normal photographing mode, a landscape photographing mode, a portrait photographing mode, a close-up photographing mode and a night photographing mode and the second photographing mode includes at least a sports photographing mode.

Also, it is preferred that: an aperture that is operated to adjust a quantity of subject light entering the image-capturing element is further provided; and the setting unit increases the predetermined reference change quantity in steps as an aperture value set at the aperture increases.

Also, it is preferred that: a photometering unit that detects a brightness of a predetermined area of the subject is further provided; and the setting unit sets a larger value for the predetermined reference change quantity as the brightness becomes lower.

Also, it is preferred that: the image-capturing element includes a plurality of pixels; a number of recording pixels to be used for recording in data of the image captured by the image-capturing element can be varied; and the setting unit sets a larger value for the reference change quantity as the number of recording pixels becomes smaller.

Also, it is preferred that: a detection unit that detects a full-aperture F value of the photographic lens is further provided; and the setting unit sets a larger value for the reference change quantity as the full-aperture F value increases.

Also, it is preferred that: a detection unit that detects a voltage of a camera drive battery is further provided; and the setting unit sets a larger value for the reference change quantity as the voltage of the camera drive battery becomes lower.

Also, it is preferred that: a timer that starts a time count upon completion of an initial focusing operation is further provided; and the setting unit sets a larger value for the reference change quantity as a greater length of time is counted at the timer.

Also, it is preferred that: the focusing operation unit performs the focusing operation at the photographic lens at all times based upon the focus evaluation value regardless of whether or not a shutter release button has been pressed halfway down; and the setting unit sets a smaller value for the reference change quantity while the shutter release button is held halfway down than a value set when the shutter release button is not being held halfway down.

Another camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a decision-making unit that makes a decision as to whether or not the focus evaluation value calculated after an end of the focusing operation is within a shutter release enabled range over which a photographing operation is enabled; a shutter release enabling unit that enables the photographing operation in response to a photographing command if the decision-making unit decides that the focus evaluation value is within the shutter release enabled range; a photographing unit that executes a photographing operation if a photographing command is output while a photographing operation is enabled by the shutter release enabling unit; and a restart unit that enables the focusing operation unit in a focusing operation based upon the focus evaluation value calculated after the end of the focusing operation. And: the decision-making unit performs a decision-making operation when a preparation signal for the photographing command is output; and the restart unit executes a restart if the focus evaluation value deviates from the shutter release enabled range based upon results of the decision made by the decision-making unit.

In this camera, it is preferred that when the preparation signal for the photographing command is not output, the restart unit executes a restart if the focus evaluation value deviates from a restart disabled range which is different from the shutter release enabled range. In this case, it is preferred that the restart disabled range is wider than the shutter release enabled range. Or, it is preferred that a setting unit that sets the shutter release enabled range in conformance to a photographing condition is further provided.

In this case, it is preferred that: a focal length of the photographic lens is variable and the focal length constitutes the photographing condition; and the setting unit sets the shutter release enabled range in correspondence to the focal length.

Also, it is preferred that: the photographing condition includes a first photographing mode suited for photographing a subject that moves slightly or almost not at all and a second photographing mode suited for photographing a subject that moves faster than the subject in the first photographing mode; and the setting unit sets a narrower shutter release enabled range in the second photographing mode than in the first photographing mode. In this case, it is preferred that the first photographing mode includes at least one of a normal photographing mode, a landscape photographing mode, a portrait photographing mode, a close-up photographing mode and a night photographing mode and the second photographing mode includes at least a sports photographing mode.

Also, it is preferred that: an aperture that is operated to adjust a quantity of subject light entering the image-capturing element, is further provided; an aperture value set at the aperture constitutes the photographing condition; and the setting unit sets a wider shutter release enabled range as the aperture value increases.

Also, it is preferred that: a photometering unit that detects a brightness of a predetermined area of the subject is further provided; the brightness detected by the photometering unit constitutes the photographing condition; and the setting unit sets a wider shutter release enabled range as the brightness becomes lower.

Also, it is preferred that: the image-capturing element includes a plurality of pixels; a number of recording pixels to be used for recording in data of the image captured by the image-capturing element can be varied; the number of recording pixels constitutes the photographing condition; and the setting unit sets a wider shutter release enabled range as the number of recording pixels becomes smaller.

Also, it is preferred that a detection unit that detects a full-aperture F value of the photographic lens and a setting unit that sets the shutter release enabled range in conformance to the full-aperture F value, are further provided.

Also, it is preferred that: a timer that starts a time count upon completion of a predetermined camera operation is further provided; and the setting unit sets a narrower shutter release enabled range as a greater length of time is counted at the timer.

Another camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a restart unit that engages the focusing operation unit in a focusing operation when the focus evaluation value calculated after an end of the focusing operation satisfies a restart condition; a photographing unit that performs a photographing preparation operation in response to a photographing preparation command and performs a photographing operation in response to a photographing command; and an adjustment unit that changes the restart condition in conformance to whether or not the photographing preparation command has been issued.

In this camera, it is preferred that the adjustment unit changes the restart condition so as to restart the focusing operation more readily when the photographing preparation command has been issued compared to when the photographing preparation command has not been issued.

Another camera according to the present invention comprises: an image-capturing element that captures a subject image through a photographic lens; an evaluation value calculation unit that calculates a focus evaluation value based upon an image-capturing signal output from the image-capturing element; a focusing operation unit that performs a focusing operation at the photographic lens based upon the focus evaluation value; a decision-making unit that makes a decision as to whether or not the focus evaluation value calculated after an end of the focusing operation is within a shutter release enabled range over which a photographing operation is enabled; a shutter release enabling unit that enables the photographing operation in response to a photographing command if the decision-making unit decides that the focus evaluation value is within the shutter release enabled range; and a photographing unit that executes the photographing operation if the photographing command is output while the photographing operation is enabled by the shutter release enabling unit.

It is preferred that the above first camera further comprises: a drive unit that moves the photographic lens along an optical axis; a storage unit that individually stores a plurality of focus evaluation values calculated by the evaluation value calculation unit while the photographic lens is moved by the drive unit and lens positions assumed by the photographing lens when the plurality of focus evaluation values are calculated; and a distance setting unit that sets a distance to be traveled by the photographic lens for a restart of the focusing operation based upon the focus evaluation values and the lens positions stored in the storage unit and the focus evaluation value calculated at the restart.

In this case, it is preferred that the distance setting unit sets the distance to a value representing a distance between a first lens position corresponding to a focus evaluation value substantially equal to the focus evaluation value calculated at the restart among the focus evaluation values stored in the storage unit and a second lens position corresponding to a largest focus evaluation value among the focus evaluation values stored in the storage unit.

Also, it is preferred that the distance setting unit sets the distance so as to allow the photographic lens to be driven at the restart toward a close-up side of the lens position.

Another camera according to the present invention comprises: an image-capturing element that captures a subject image through a photographic lens; an evaluation value calculation unit that calculates a focus evaluation value based upon an image-capturing signal output from the image-capturing element; a drive unit that moves the photographic lens along an optical axis; a storage unit that individually stores a plurality of focus evaluation values calculated by the evaluation value calculation unit while the photographic lens is moved by the drive unit and lens positions assumed by the photographic lens when the plurality of focus evaluation values are calculated; a focusing operation unit that performs a focusing operation by moving the photographic lens so as to achieve a maximum focus evaluation value; a restart unit that restarts the focusing operation unit after focus is achieved by the focusing operation unit; and a distance setting unit that sets a distance to be traveled by the photographic lens for a restart of the focusing operation unit based upon the focus evaluation values and the lens positions stored in the storage unit and the focus evaluation value calculated at the restart.

DESCRIPTION OF THE PREFERRED EMBODIMENTS

The following is an explanation of the embodiments of the present invention, given in reference to the drawings.

Figure 1:
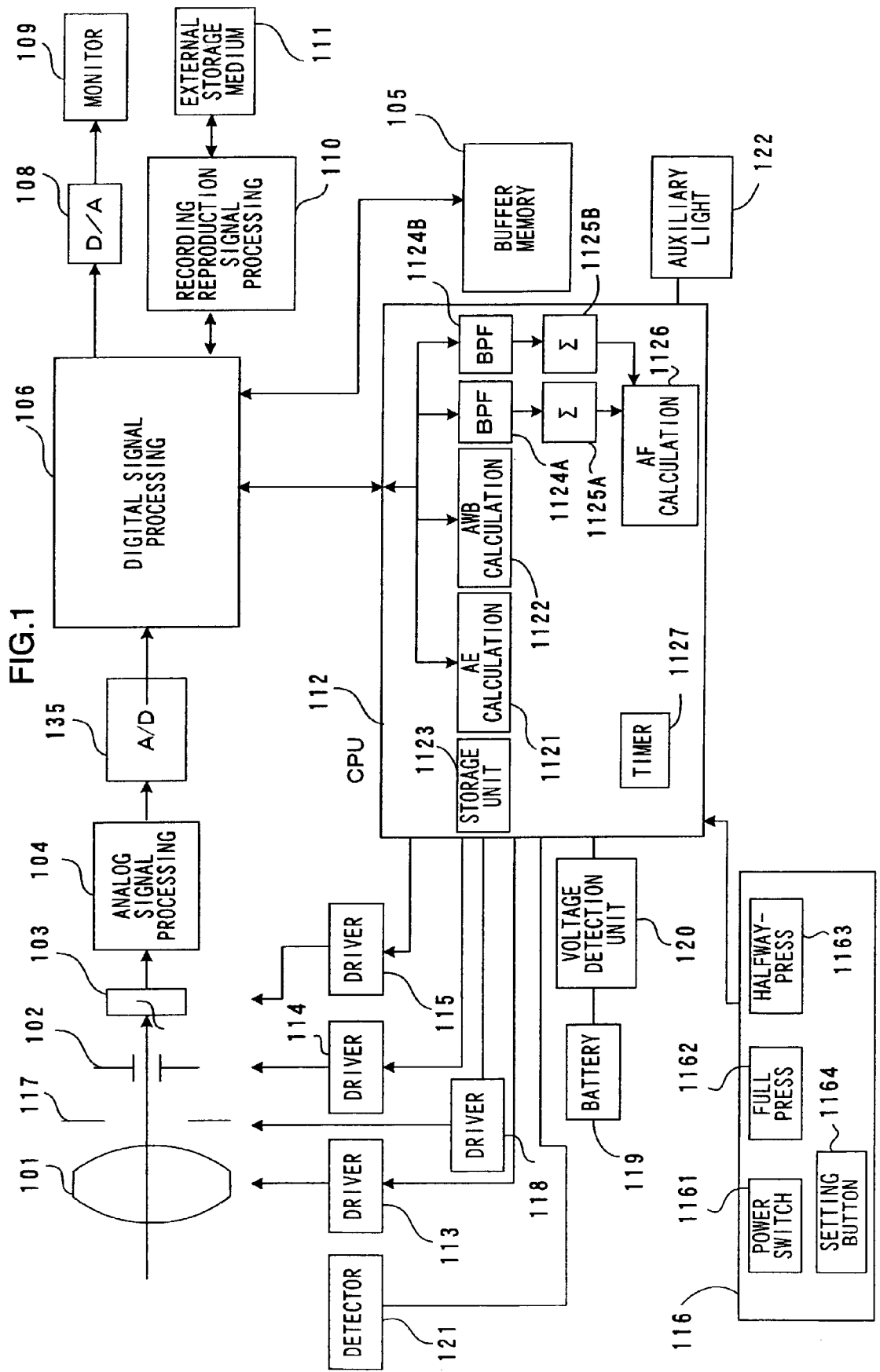
FIG. 1 is a functional block diagram of the AF digital camera according to the present invention.

FIG. 1 is a functional block diagram of an AF (autofocus) digital camera achieved in an embodiment of the present invention. Reference numeral 101 indicates an exchangeable photographic lens, and the photographic lens 101 includes a ROM (not shown) in which lens information such as the full-aperture F value and the like is stored. When the photographic lens 101 is mounted at a lens mount (not shown) of the camera main body, the lens information is read out by a detector 121 provided on the main body side and the lens information thus read out is stored into a storage unit 1123.

It is to be noted that the photographic lens 101, which is a zoom lens, includes a focusing lens employed for focus position adjustment and a variable power lens employed to change the focal length. The photographic lens 101 is driven by a driver 113. Namely, the driver 113 is provided with a zoom drive mechanism for the zoom lens and its drive circuit and a focus drive mechanism for the focusing lens and its drive circuit, and the individual components of the driver 113 are controlled by a CPU 112.

The photographic lens 101 forms a subject image on the image-capturing surface of an image-capturing element 103. The image-capturing element 103 which is a photoelectric conversion image-capturing element that outputs an electric signal corresponding to the intensity of the light from the subject image formed on the image-capturing surface, is constituted of a CCD solid image-capturing element or a MOS solid image-capturing element. The image-capturing element 103 is driven by a driver 115 that controls the timing with which a signal is extracted. An aperture 102 is provided between the photographic lens 101 and the image-capturing element 103. The aperture 102 is driven by a driver 114 which includes an aperture drive mechanism and its drive circuit. An image-capturing signal provided by the solid image-capturing element 103 are input to an analog signal processing circuit 104 where they undergo processing such as correlated double sampling processing (CDS processing). The analog image-capturing signal having undergone the processing at the analog signal processing circuit 104 is then converted to a digital signal at an A/D converter 135.

A digital signal processing circuit 106 implements various types of image processing such as edge compensation and gamma correction on the signals having undergone the A/D conversion. The digital signal processing circuit 106 includes signal processing circuits such as a gain control circuit, an AE totalizing circuit, a brightness signal generating circuit and a color difference signal generating circuit. A buffer memory 105 is a frame memory in which data for a plurality of frames of images captured by the image-capturing element 103 can be stored, and the signals having undergone the A/D conversion are temporarily stored in the buffer memory 105. The digital signal processing circuit 106 reads the data stored in the buffer memory 105 and implements the various types of processing mentioned above on the data thus read. Then, the processed data are stored back into the buffer memory 105.

The CPU 112 is connected to the digital signal processing circuit 106, the drivers 113~115 and the like and implements sequence control for the camera operation. An AE calculation unit 1121 at the CPU 112 performs an automatic exposure calculation based upon image signals provided by the image-capturing element 103, and an AWB calculation unit 1122 at the CPU 112 calculates a white balance adjustment coefficient. Two types of band pass filters (BPFs) 1124A and 1124B extract high frequency components in bands corresponding to different characteristics based upon the image-capturing signal within a focus detection area set in the image-capturing area. It is to be noted that if a plurality of focus detection areas are set, the signals in the individual focus detection areas are sequentially read out, and the band pass filters (BPF) 1124A and 1124B execute extraction processing for each focus detection area.

The outputs from the BPFs 1124A and 1124B are respectively input to evaluation value calculation units 1125A and 1125B, and the evaluation value calculation units 1125A and 1125B each calculate a focus evaluation value by integrating the absolute values of the high frequency components. An AF calculation unit 1126 performs an AF calculation through the contrast method based upon these focus evaluation values. The CPU 112 enables a focusing operation by adjusting the position of the focusing lens at the photographic lens 101 based upon the results of the calculation performed by the AF calculating unit 1126.

Figure 21:
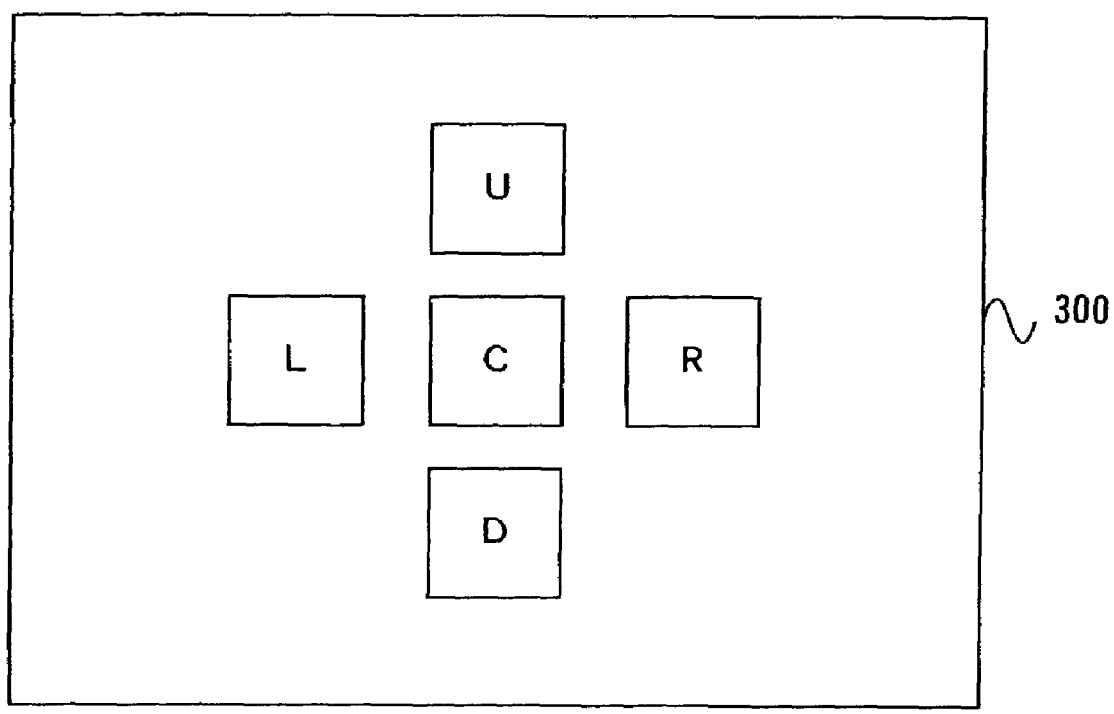
FIG. 21 shows a plurality of focus detection areas set in the photographic image plane.

In the hill-climbing AF camera according to the present invention, a single focus detection area may be set at the center of the photographic image plane or a plurality of focus detection areas may be set both on-axis and off-axis. If a single focus detection area is set on the optical axis, two focus evaluation values are calculated and these focus evaluation values are stored into the AF calculating unit 1126. FIG. 21 shows multiple focus detection areas. Five focus detection areas, i.e., an area C on the optical axis, off-axis areas R and L set over a predetermined distance from the optical axis along the horizontal direction and off-axis areas U and D set over a predetermined distance from the optical axis along the vertical direction, are set in a photographic image plane 300. For each of these five focus detection areas, the evaluation value calculation units 1125A and 1125B integrate the absolute values of the high frequency components in the focus detection image signals having passed through the two types of band pass filters mentioned earlier. An integration performed within a focus detection area is referred to as an area internal integration, and the value obtained through such an integration is a focus evaluation value. Accordingly, a multipoint autofocus camera performs hill-climbing AF at the AF calculating unit 1126 based upon the 10 area internal integration values to focus the photographic lens 101.

At an operating unit 116 connected to the CPU 112, a power switch 1161 which is operated to turn on/off the power to the camera, a full press switch 1162 and a halfway-press switch 1163 which are turned on/off by interlocking with the shutter release button and a setting button 1164 operated to select a photographing mode and the like are provided. The photographing modes that can be set through the setting button 1164 include a normal photographing mode, a distant view photographing mode, a portrait photographing mode, a sports photographing mode, a close-up mode and a night photographing mode. When one of these switches and buttons is operated, a signal corresponding to the operation is input to the CPU 112.

Reference numeral 119 indicates a battery, and the battery voltage is detected by a voltage detection unit 120. Reference numeral 118 indicates a driver that drives a shutter 117. In addition, an AF auxiliary light 122 illuminates the subject when the brightness level is low. The CPU 112 includes a storage unit 1123 in which various types of data are stored and a timer 1127. The timer 1127, which is normally referred to as a halfway-press timer, starts a count when a halfway-press operation of the shutter release button is cleared or after a first focus is achieved following a power-ON as explained later. When the count is completed, a load that consumes power is stopped or the load is driven in a power saving mode.

Image data obtained through the various types of processing implemented at the digital signal processing circuit 106 are first stored into the buffer memory 105, and then are recorded into an external storage medium 111 such as a memory card via a recording/reproduction signal processing circuit 110. The image data to be recorded into the storage medium 111 are normally compressed in a specific compression format, e.g., the JPEG format. The recording/reproduction signal processing circuit 110 compresses the image data to be recorded into the external recording medium 111 and also implements data decompression processing when reading the compressed image data read from the storage medium 111. The recording/reproduction signal processing circuit 110 includes an interface through which data communication with the storage medium 111 is achieved.

A monitor 109 which is a liquid crystal display device for displaying captured subject images is also utilized to display images by reproducing the image data recorded in the storage medium 111. When displaying an image at the monitor 109, image data stored in the buffer memory 105 are read out and the digital image data are converted to analog image signals at a D/A converter 108. Then, the image based upon the analog image signals is displayed at the monitor 109.

A subject image captured by the image-capturing element 103 may be displayed at the monitor 109 in either of the following two display modes. One of the display modes is a so-called through image display mode for displaying images without performing a shutter release operation, in which the display is updated sequentially to bring up the subject images repeatedly captured by the image-capturing element 103. The other display mode is a freeze image display mode in which the subject image captured by the image-capturing element 103 is displayed over a predetermined length of time following a shutter release operation at the camera.

In the contrast method, focus is achieved by taking advantage of the correlation between the extent of image blur and the contrast whereby the image contrast is at its highest when focus is achieved. The contrast level can be evaluated in correspondence to the level of the high frequency components in the image-capturing signal. Namely, the high frequency components in the image-capturing signal are extracted by the BPFs 1124A and 1124B and the focus evaluation values are obtained by integrating the absolute values of the high frequency components at the evaluation value calculation units 1125A and 1125B. These focus evaluation values each peak when focus is achieved and the contrast is at its highest. As explained earlier, the AF calculating unit 1126 performs AF calculation based upon the focus evaluation values. The CPU 112 enables the focusing operation by adjusting the position of the focusing lens at the photographic lens 101 based upon the results of the calculation performed by the AF calculating unit 1126.

(Explanation of Camera Operation)

Figure 8:
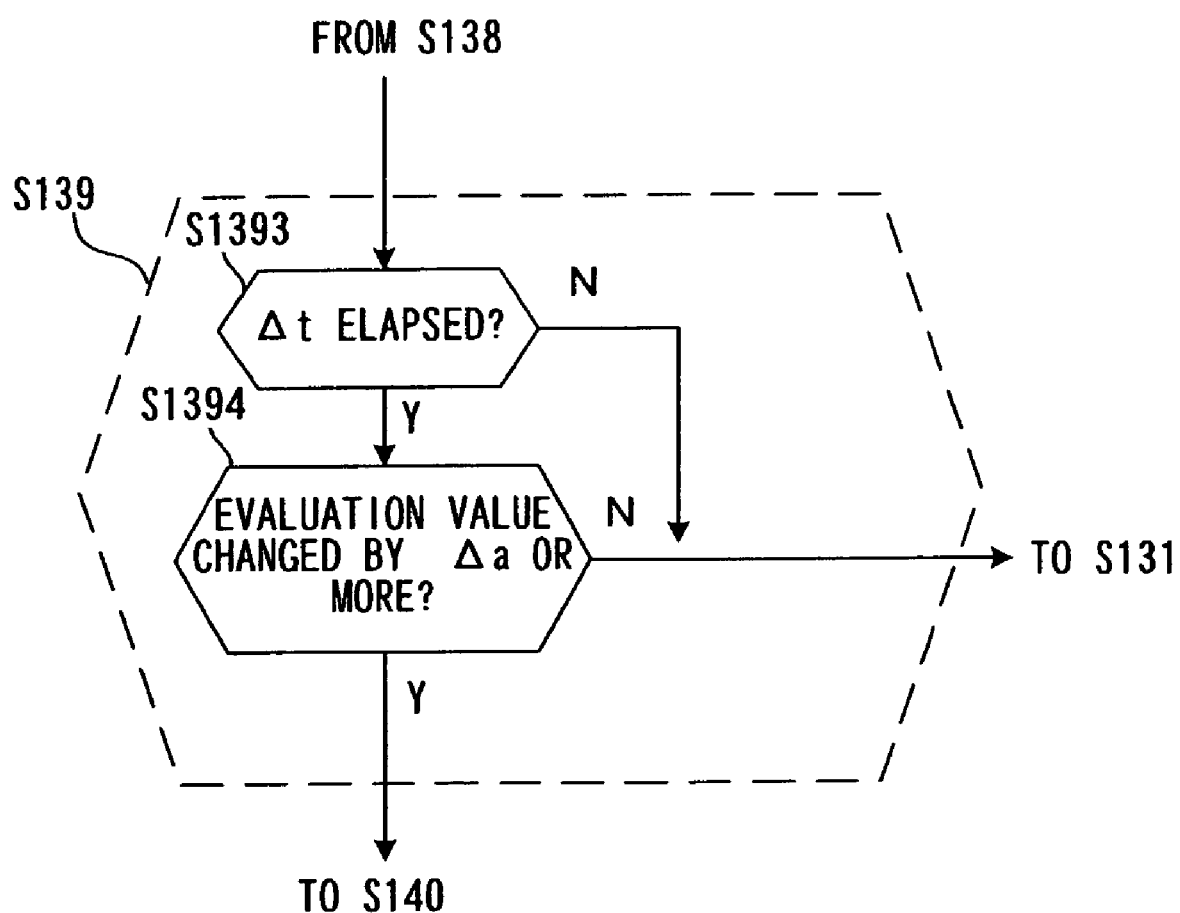
FIG. 8 presents a third example of the specific processing executed in step S139.
Figure 9:
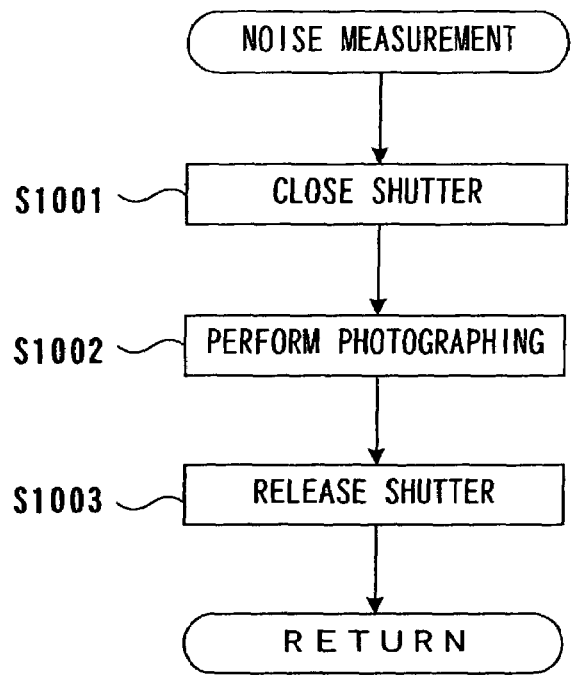
FIG. 9 presents a flowchart of a first example of the noise measurement implemented in step S100 in FIG. 2.
Figure 10:
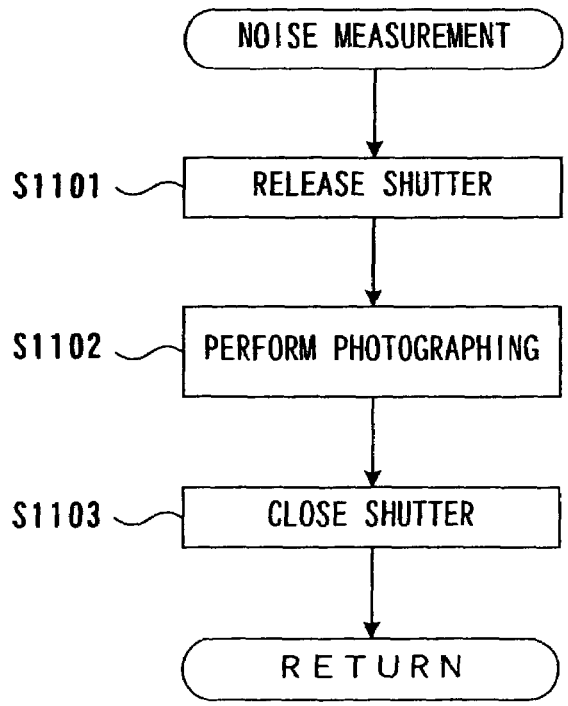
FIG. 10 presents a flowchart of a second example of the noise measurement implemented in step S100 in FIG. 2.

Next, the camera operation is explained in reference to the flowcharts presented in FIGS. 2~10. As the power switch 1161 in FIG. 1 is turned on, the processing in the flowchart in FIG. 2 starts. In step S100, the noise contained in an image-capturing signal from the CCD 103 is measured. FIGS. 9 and 10 show specific examples of the processing implemented in step S100. In the first example in FIG. 9, an image is captured in step S1002 after the shutter 117 in FIG. 1 is closed instep S1001. While the subject light, which is blocked by the shutter 117, does not enter the CCD 103 at this time, the CCD 103 still outputs a very small noise signal attributable to the dark current and the like. Then, focus evaluation values are calculated based upon the signal output by the CCD 103 and the results of the calculation are stored into the storage unit 1123. These results are referred to as a noise level $\Delta S$. Subsequently, the shutter 117 is opened in step S1003.

In the second example presented in FIG. 10, the noise level is measured during a camera adjustment. In step S1101, the shutter 117 is opened. A photographing operation is performed in step S1102 and the focus evaluation values (noise level) are calculated. The noise level that has been calculated is stored into the storage unit 1123. Subsequently, the shutter 117 is closed in step S1103.

Figure 11:
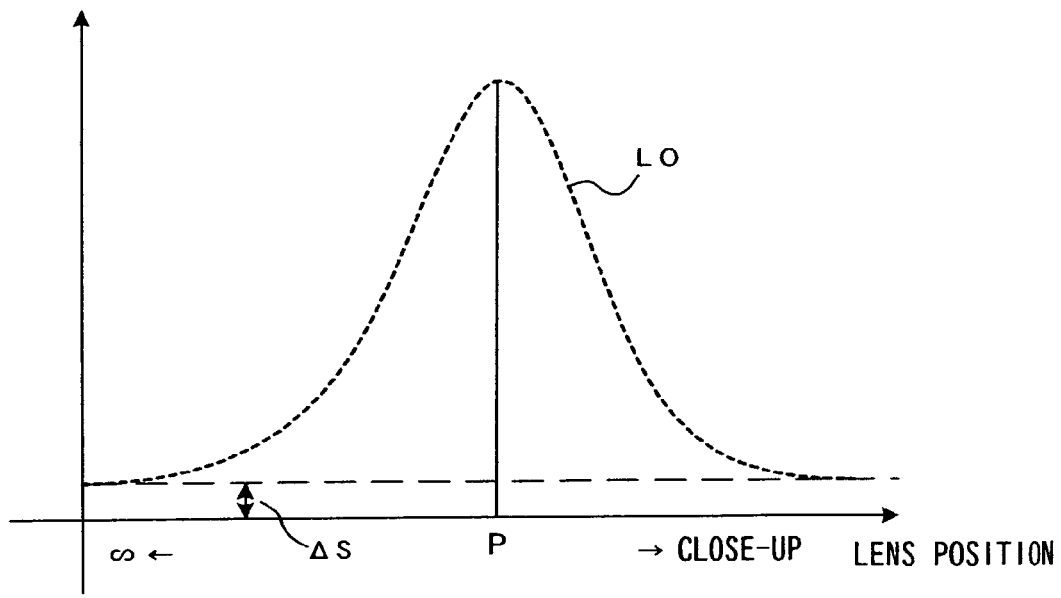
FIG. 11 is a diagram of the focus evaluation value curve L0 and the noise level ΔS.

The focus evaluation values calculated in step S1103 may be considered to represent the noise level corresponding to the focus evaluation values. A curve L0 in FIG. 11 represents focus evaluation values relative to varying lens positions of the focusing lens, and the focus evaluation values obtained through the calculation contains the noise level $\Delta S$. Subsequently, the difference obtained by subtracting the noise level $\Delta S$ from the calculated focus evaluation value is used as the actual focus evaluation value. By eliminating the noise level from the focus evaluation value in this manner, an even more accurate focusing operation is achieved. When there are a plurality of focus detection areas, the noise level $\Delta S$ is subtracted from the focus evaluation values obtained in correspondence to the individual focus detection areas.

Figure 2:
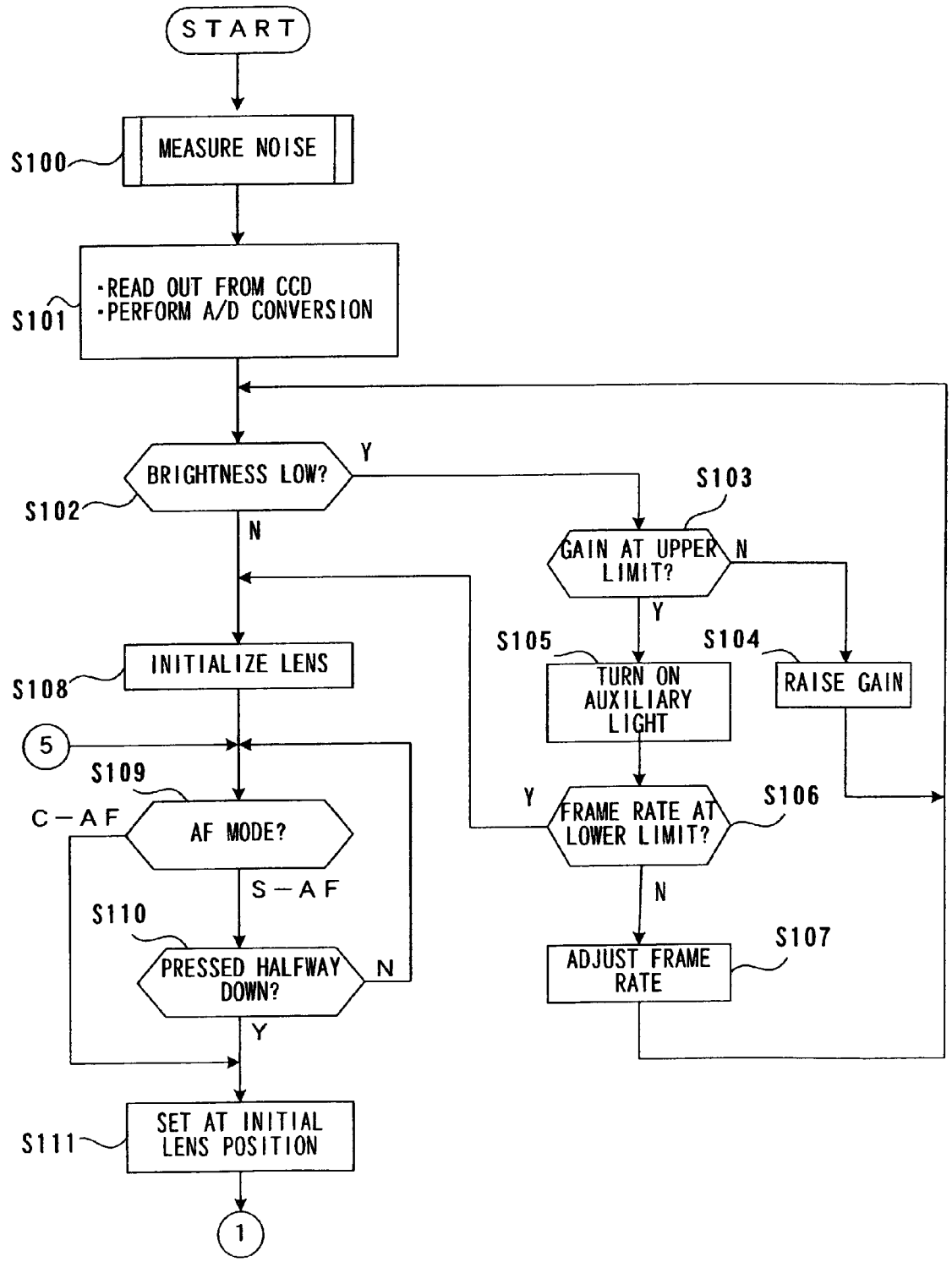
FIG. 2 presents a flowchart of the operation performed in the camera.

In FIG. 2, the image-capturing signal is read out from the CCD 103 and the image-capturing signal thus read out undergoes A/D conversion at the A/D converter 135 in step S101. In addition, the image signals are taken from the digital signal processing circuit 106 into the buffer memory 105, and the subject brightness is calculated through an AE calculation performed by using the image signal. In step S102, a decision is made as to whether or not the subject brightness calculated at the AE calculation unit 1121 is equal to or lower than a predetermined level. In other words, a decision is made as to whether or not the subject brightness is low. If it is decided in step S102 that the subject brightness is equal to or lower than the predetermined level, the operation proceeds to step S103, whereas if the subject brightness is determined to be higher than the predetermined level, the operation proceeds to step S108.

If the operation proceeds from step S102 to step S103, a decision is made in step S103 as to whether or not the gain setting is at the upper limit. The image signal output from the A/D converter 135 is amplified within the digital signal processing circuit 106 based upon this gain setting. If it is decided in step S103 that the gain setting is not at the upper limit, the operation proceeds to step S104 to raise the gain setting by one level. For instance, if the ISO sensitivity (speed) is currently set to 100, the sensitivity is raised by one level to 200. Then, the operation returns from step S104 to step S102 to make a decision as to whether or not the subject brightness after the gain setting change is equal to or lower than the predetermined level. If, on the other hand, it is decided in step S103 that the gain setting is at its upper limit, i.e., if it is decided that the ISO sensitivity is set to the highest level (e.g., 800), the AF auxiliary light 122 is lit in step S106. It is to be noted that the auxiliary light remains lit until the focusing operation is completed.

In the following step S106, a decision is made as to whether or not the frame rate setting for the image-capturing signal output from the CCD 103 is at its lower limit. If it is decided in step S106 that the frame rate setting is that the lower limit, the operation proceeds to step S108, whereas if it is decided that the frame rate setting is not at the lower limit, the operation proceeds to step S107. In the latter case, after the frame rate is lowered by one level in step S107, the operation returns to step S102. Namely, since the subject brightness is low, the storage period at the CCD 103 is lengthened by lowering the frame rate in step S107. As in the case of the gain settings, a plurality of frame rate settings are made available in advance. In step S108, the absolute position of the photographic lens 101 is detected by utilizing a photocoupler or the like and the reference position for the lens is determined.

The camera achieved in the embodiment can be set in a single AF mode (S-AF) in which an AF operation is performed only when the halfway-press switch 1163 has been pressed halfway down and once focus is achieved, the focus state is sustained until the halfway-press operation is cleared, or a continuous AF mode (C-AF) in which an AF operation is performed constantly regardless of whether or not a halfway-press operation has been performed. The setting button 1164 shown in FIG. 1 is operated to switch from one of these modes to the other. In step S109, a decision is made as to whether the camera is set in the C-AF or the S-AF, and if it is decided that the camera is set in the S-AF, the operation proceeds to step S110. In step S110, a decision is made as to whether or not a halfway-press operation has been performed, and the operation returns to step S109 if it is decided that a halfway press operation has not been performed, whereas the operation proceeds to step S111 if it is decided that a halfway-press operation has been performed. If, on the other hand, it is decided in step S109 that the camera is set in the C-AF, the operation proceeds to step S111. After moving the focusing lens to its initial position in step S111, the operation proceeds to step S112 in FIG. 3. The initial position may be the infinity side end position or the close-up side (closer side) end position.

Figure 3:
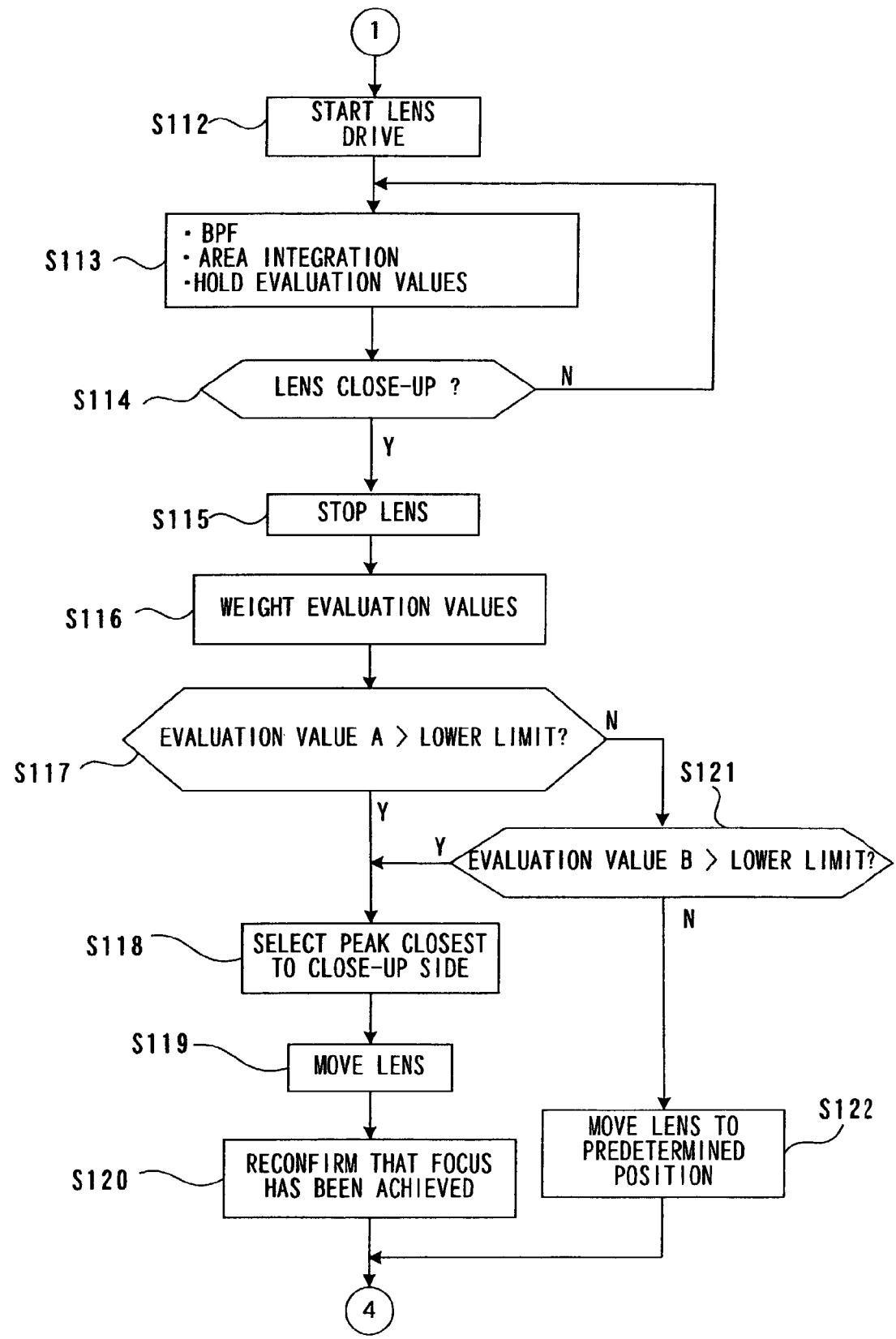
FIG. 3 presents a flowchart of the processing continuing from the processing in the flowchart presented in FIG. 2.

During the processing from step S112 through step S115 in FIG. 3, the focus evaluation values are sampled over the entire range of the lens position. Namely, a full range scan is performed. First, the focusing lens at the photographic lens 101 starts to move in step S112. For instance, the lens position is moved from the infinity side end position toward the close-up side end position. In step S113, the evaluation value calculation unit 1125A performs an area internal integration by using the signal obtained by processing the image-capturing signal within a focus detection area at the BPFs 1124A and the evaluation value calculation unit 1125B performs an area internal integration by using the signals obtained by processing the image-capturing signal within the focus detection area at the BPF 1124B. These calculation results are individually stored into the storage unit 1123 in correspondence to varying lens sampling positions. If there are a plurality of focus detection areas, the number of focus evaluation values stored is twice the number of focus detection areas. In step S114, a decision is made as to whether or not the lens position has reached the close-up side end position. If it is decided in step 114 that the lens is now at the close-up side end position, the operation proceeds to step S115 to stop the lens drive. If, on the other hand, it is decided in step S114 that the lens is not at the close-up side end position, the operation returns to step S113 to calculate and store focus evaluation values again. Thus, through the processing performed in steps S112~S115, focus evaluation values corresponding to each sampling position between the close-up side end position and the infinity side end position of the focusing lens are stored into the storage unit 1123.

It is to be noted that while the focusing lens of the photographic lens 101 travels from the close-up side end position toward the infinity side end position, the image in the focus detection area is taken in over a predetermined sampling time interval to calculate focus evaluation values. However, the lens movement may be halted at each lens position, and focus detection image signals may be taken in to calculate focus evaluation values at each stop, instead.

Figure 12:
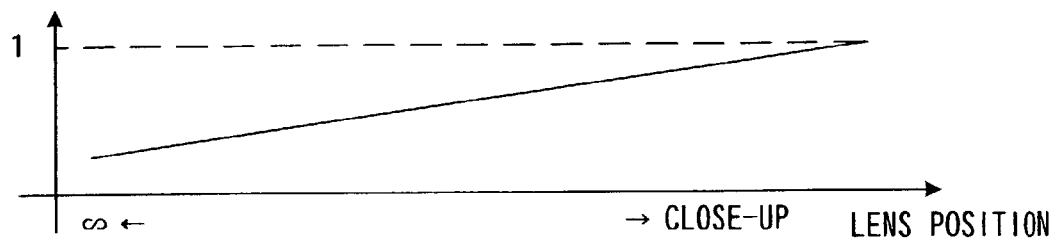
FIG. 12 shows a first example of the weighting curve.
Figure 13:
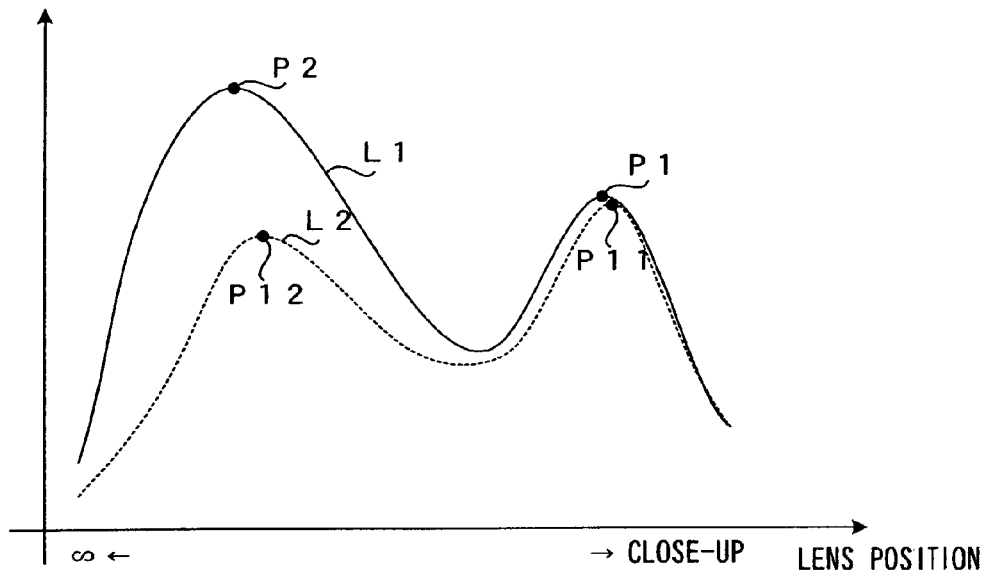
FIG. 13 shows the focus evaluation value curves obtained before and after the weighting processing.

In step S116, a specific type of weighting processing is executed with regard to the individual focus evaluation values that have been calculated. FIGS. 12 and 13 shows an example of weighting processing. FIG. 12 shows a weighting curve, with the horizontal axis representing the lens position and the vertical axis representing the weighting quantity. The infinity side end position is set on the horizontal axis at the origin point and the close-up side end position is set on the furthest side along the positive direction on the horizontal axis. The weighting curve in FIG. 12 that is used in an AF mode in which priority is given to a subject at the close-up end position is a straight line with the weight at the close-up end position set to 1 and the weighting becoming smaller toward the infinity side.

If focus evaluation values represented by the curve L1 in FIG. 13 are weighted as illustrated in FIG. 12, corrected focus evaluation values represented by the curve L2 are obtained. It is to be noted that since the focus evaluation values are obtained as discrete data, the curves L1 and L2 are estimated through interpolation. The curves L1 and L2 each include two peaks, and the focus evaluation value at a peak P2 of the curve L1 on the infinity side is larger than the focus evaluation value at a peak P1 on the close-up side. In the focus evaluation value curve L2 obtained through the weighting processing, on the other hand, the focus evaluation value at a peak P11 on the close-up side is larger than the focus evaluation value at a peak P12 on the infinity side. Thus, when the lens position corresponding to the largest focus evaluation value is to be set as the focus position, the position manifesting the peak P11 on the close-up side is selected. For this reason, the weighting curve in FIG. 12 is suited for use in close-up photographing operation such as a macro photographing operation or a portrait photographing operation.

Weighting may be achieved as described below when a plurality of focus detection areas are set as shown in FIG. 21.

1. In the portrait photographing mode, the focus evaluation values in the focus detection area C at the center are weighted to the greatest extent.
2. If an attitude detection sensor that detects the camera attitude is provided, the plurality of focus detection areas are weighted in conformance to the detected camera attitude. For instance, in the portrait photographing mode, the focus evaluation values in the central focus detection area C and the peripheral focus detection area U set above the focus detection area C along the vertical direction are weighted to a great extent based upon the camera attitude detected by the attitude detection sensor.

Figure 14:
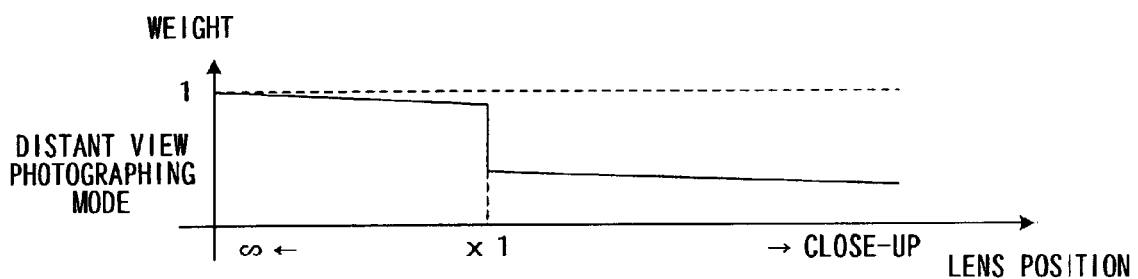
FIG. 14 shows the weighting curve used in the distant view photographing mode.
Figure 15:
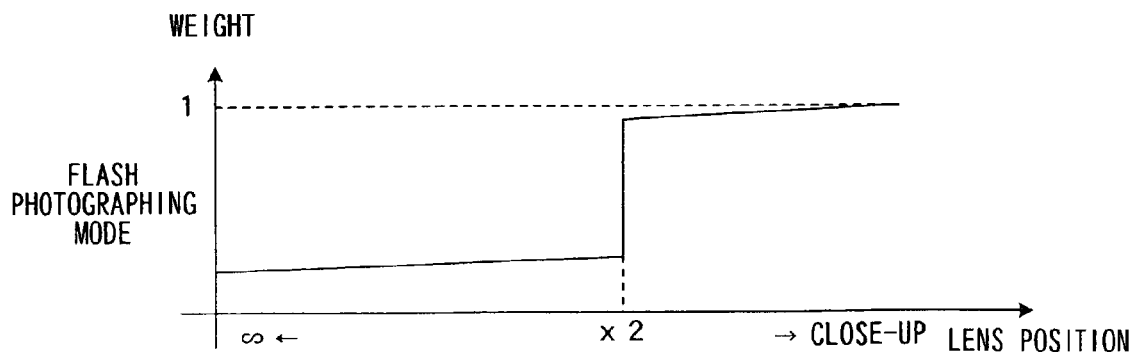
FIG. 15 shows the weighting curve used in the flash photographing mode.

FIG. 14 shows another example of a weighting curve which may be used in the distant view photographing mode. The weighting curve changes in a step at a lens position x1, with the weighting quantity on the close-up side relative to the lens position x1 reduced compared to the weighting quantity on the infinity side. In addition, FIG. 15 shows a weighting curve that may be used in the flash photographing mode in which the photographing operation is performed with an electronic flash unit, with the weighting quantity on the close-up side relative to a lens position x2 raised, in contrast to the weighting curve used in the distant view photographing mode. The lens position x2, which is dependent on the guide number of the electronic flash unit is set in correspondence to the reach of the illuminating light.

Back in FIG. 3, a decision is made in step S117 as to whether or not a focus evaluation value A obtained through the BPF 1124A is larger than the lower limit at which a focusing operation is enabled. If it is decided in step S117 that the focus evaluation value is larger than the lower limit, the operation proceeds to step S118, whereas if it is decided that the focus evaluation value is equal to or smaller than the lower limit, the operation proceeds to step S121. If the operation proceeds from step S117 to step S121, a decision is made in step S21 as to whether or not a focus evaluation value B obtained through the BPF 1124B having a mean frequency, a bandwidth or the like different from that of the BPF 1124A is larger than the lower limit at which a focusing operation is enabled. If it is decided in step S121 that the focus evaluation value is larger than the lower limit, the operation proceeds to step S118, whereas if it is decided that the focus evaluation value is equal to or smaller than the lower limit, the operation proceeds to step S122. In step S122, it is judged that the contrast of the subject is low since both the focus evaluation values A and B are equal to or lower than the lower limit and, accordingly, the focusing lens is moved to a predetermined lens position.

If the operation proceeds from step S117 or step S121 to step S118, a close-up side peak is selected based upon the focus evaluation value A or B that exceeds the lower limit. For instance, if the evaluation values represented by the curve L2 in FIG. 13, the lens position at the peak P11 is selected as the close-up side peak. In step S119, the focusing lens is moved to the lens position corresponding to the close-up side peak selected in step S118. Following the lens movement, the focus evaluation values after the lens movement are obtained in step S120 to reconfirm that a focus state has been achieved. A full ranges can focusing operation is executed through the processing in steps S11~S120 in this manner. In the full range scan focusing operation, the focus evaluation values are obtained by scanning the entire range over which the photographic lens or, more specifically, the focusing lens is moved for focusing to ascertain the peak of the focus evaluation values.

If there are a plurality of a focus detection areas as shown in FIG. 21, all the evaluation values A determined to be larger than the predetermined value in step S117 are stored in memory. Likewise, all the evaluation values B determined to be larger than the predetermined value in step S121 are stored in memory. Then, if there are a plurality of evaluation values A or B stored in memory, the focus detection area manifesting a peak at a lens position nearest the close-up side end among these focus evaluation values is selected.

Figure 4:
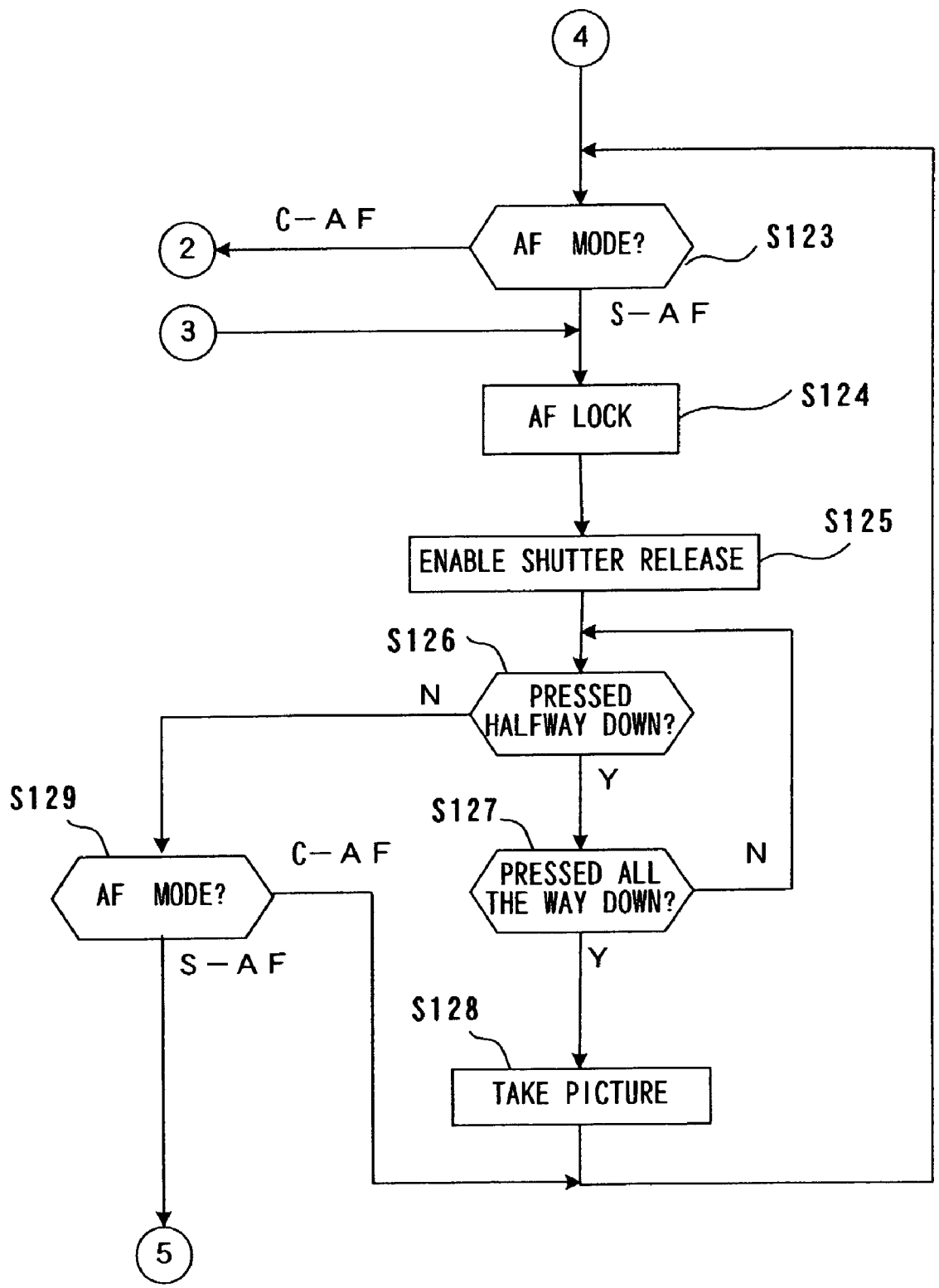
FIG. 4 presents a flowchart of the processing continuing from the processing in the flowchart presented in FIG. 3.

Next, in step S123 in FIG. 4, a decision is made as to whether the AF mode setting in the camera is the C-AF or the S-AF. If it is decided in step S123 that the camera is set in the C-AF, the operation proceeds to step S130 in FIG. 5, whereas if the camera is determined to be set in the S-AF, the operation proceeds to step S124. First, an explanation is given on a case in which the S-AF is set, i.e., a case in which the operation proceeds from step S123 to step S124. In step S124, an AF lock is effected at the focus position confirmed in step S120.

Once the AF lock is effected in step S124, a flag indicating a shutter release enabled state is set in the following step S125. If the shutter release enabled flag is set when the full-press switch 1162 is turned on, a photographing operation is started. In step S126, a decision is made as to whether or not the halfway-press switch 1163 has been turned on, and if the halfway-press state is sustained and, accordingly, an affirmative decision (YES) is made, the operation proceeds to step S127, whereas if the halfway-press state has been cleared and a negative decision (NO) is made, the operation proceeds to step S129. If the operation proceeds from step S126 to step S127, a decision is made in step S127 as to whether or not the full-press switch 1162 has been turned on. If an affirmative decision (YES) is made in step S127, the operation proceeds to step S128 to engage in the photographing operation before returning to step S123. If, on the other hand, the operation proceeds from step S126 to step S129, a decision is made in step S129 as to whether the AF mode setting is the C-AF or the S-AF. The operation returns to step S123 if the AF mode setting is determined to be the C-AF in step S129, whereas the operation returns to step S109 in FIG. 2 if the AF mode setting is determined to be the S-AF.

Figure 5:
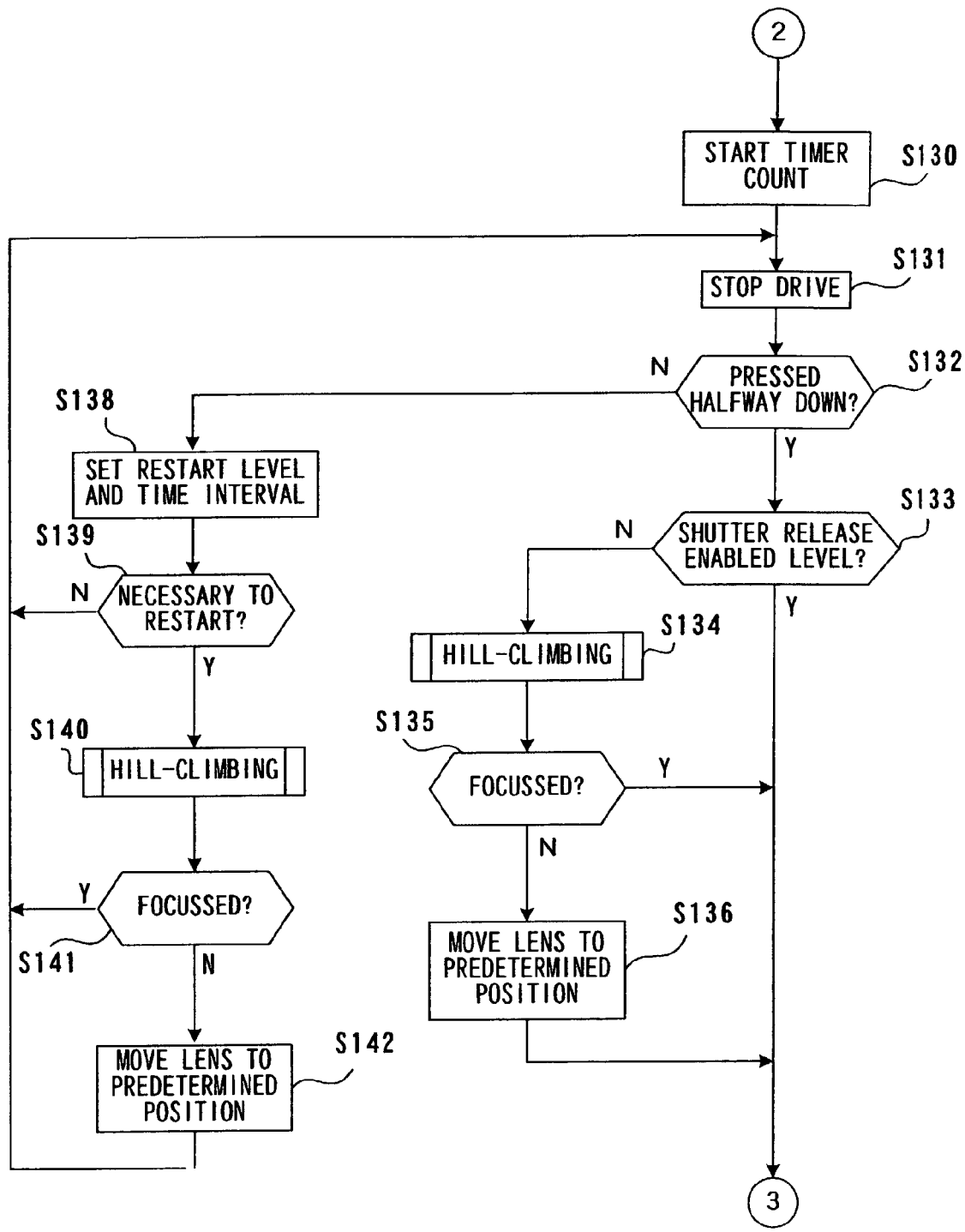
FIG. 5 presents a flowchart of the sequence of processing that is executed when a C-AF decision is made in step S123 in FIG. 4.
Figure 6:
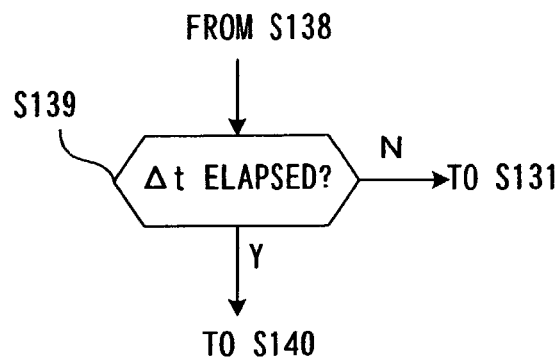
FIG. 6 presents a first example of the specific processing executed in step S139.
Figure 7:
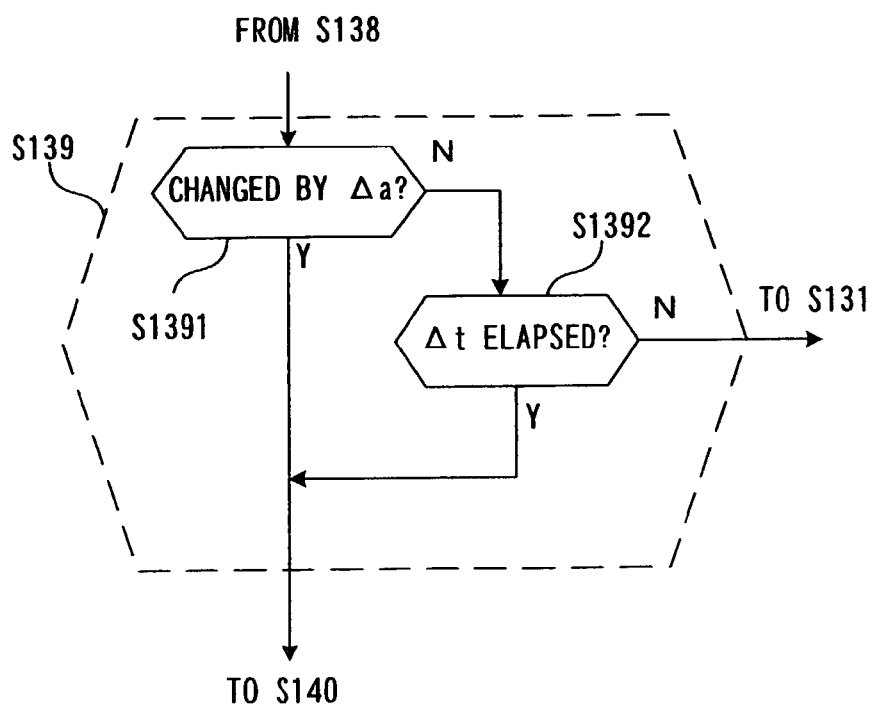
FIG. 7 presents a second example of the specific processing executed in step S139.

Next, an explanation is given on the processing executed when the camera is set in the C-AF and, accordingly, the operation proceeds from step S123 to step S130 in FIG. 5. In step S130, the timer 1127 in FIG. 1 starts a count. Next, in step S131, the focusing lens drive is stopped. In step S132, a decision is made as to whether or not the halfway-press switch 1163 has been turned on. The operation proceeds to step S133 if it is decided in step S132 that the full-press switch 1162 has been turned on, whereas the operation proceeds to step S138 if it is decided that a halfway-press operation has not been performed.

If the halfway-press switch 1163 remains in an OFF state and the operation proceeds from step S132 to step S138, a restart time interval and a reference change quantity for the focus evaluation values to be used at the restart are set in step S138 in conformance to the photographing conditions and the like. While such photographing conditions include (a)~(h) listed below, a basic principle whereby the time interval and the reference change quantity are set to larger values under conditions that do not require a restart and the subsequent AF operation to be executed frequently always applies. As a result, the battery power consumption attributable to frequent restarts can be reduced. The setting details described in (a)~(h) may be all adopted in combination, or some of them may be selectively adopted.

(a) Photographing Mode

For instance, in the distant view photographing mode and the portrait photographing mode during which the subject hardly moves or moves only slightly and thus, the peak positions of the focus evaluation values move only by very little, the time interval and the reference change quantity are set to larger values compared to those set for the normal photographing mode. In contrast, in the sports photographing mode for photographing a subject that is moving fast, the peak positions of the focus evaluation values tend to change greatly and, accordingly, the time interval and the reference change quantity are set to smaller values compared to those set for the normal photographing mode to allow frequent restarts. In addition, in the close-up photographing mode and the night photographing mode, the time interval and the reference change quantity are set to larger values than those set for the normal photographing mode.

(b) Aperture Value at the Aperture 102

Since the depth of field increases as the aperture value is set larger, i.e., as the aperture diameter is reduced, the time interval and the reference change quantity are set to larger values as the aperture value increases. The time interval and the reference change quantity are set in steps in correspondence to the aperture value. While the time interval and the reference quantity may each be set to one of the two values corresponding to two steps, i.e. high and low, it is more desirable to set each them over at least three steps.

(c) Subject Brightness

The time intervals and the reference change quantity should be set larger as the subject brightness becomes lower. For instance, once the subject brightness becomes lower than a predetermined value, the time interval and the reference change quantity should be set to larger values.

(d) Number of Recording Pixels

The image-capturing signals at all the pixels at the CCD 103 may be extracted to undergo the image processing, or the pixel data may be subsampled or culled to extract only some of the image-capturing signals. When the pixel data are subsampled, the number of recording pixels becomes smaller than the entire number of pixels at the CCD 103. For instance, when the full number of pixels is 2048×1536, the number of recording pixels can be set to 1024×768 (the XGA size) or 640×480 (VGA size) through subsampling. Accordingly, when the number of recording pixels is small and thus the image becomes less fine, the time interval and the reference change quantity are set to large values. Alternatively, the time interval and the reference change quantity may be set in conformance to the compression rate instead of the number of recording pixels. For instance, the time interval and the reference change quantity are set to larger values when the compression rate is high than those set when the compression rate is low.

(e) Battery Voltage

The time interval and the reference change quantity are set to larger values as the battery voltage becomes lower. For instance, when the battery voltage is lower than a predetermined value, the time interval and the reference change quantity are set to larger values to minimize battery power consumption.

(f) Full-aperture F Value of the Photographic Lens 101

Since the full-aperture F value changes during a zoom operation of the photographic lens 101, the time interval and the reference change quantity should be set to larger values as the full-aperture F value increases. Since the full-aperture F value varies among different single focus lenses, the time interval and the reference change quantity should be adjusted in correspondence to the F value of the lens which is currently mounted. The same principle applies when setting the time interval and the reference change quantity in a camera having an integrated lens.

(g) Focal Length of the Photographic Lens

The time interval should be shortened to as the focal length of the photographic lens increases. The maximum focus is achieved for a lens with a large focal length.

(h) Length of Elapsed Time Counted at the Timer 1127

The time interval and the reference change quantity should be set to larger values as a greater length of time elapses.

If possible, it is desirable to set the time interval and the reference change quantity in steps in conformance to changes occurring in the individual conditions.

Figure 16:
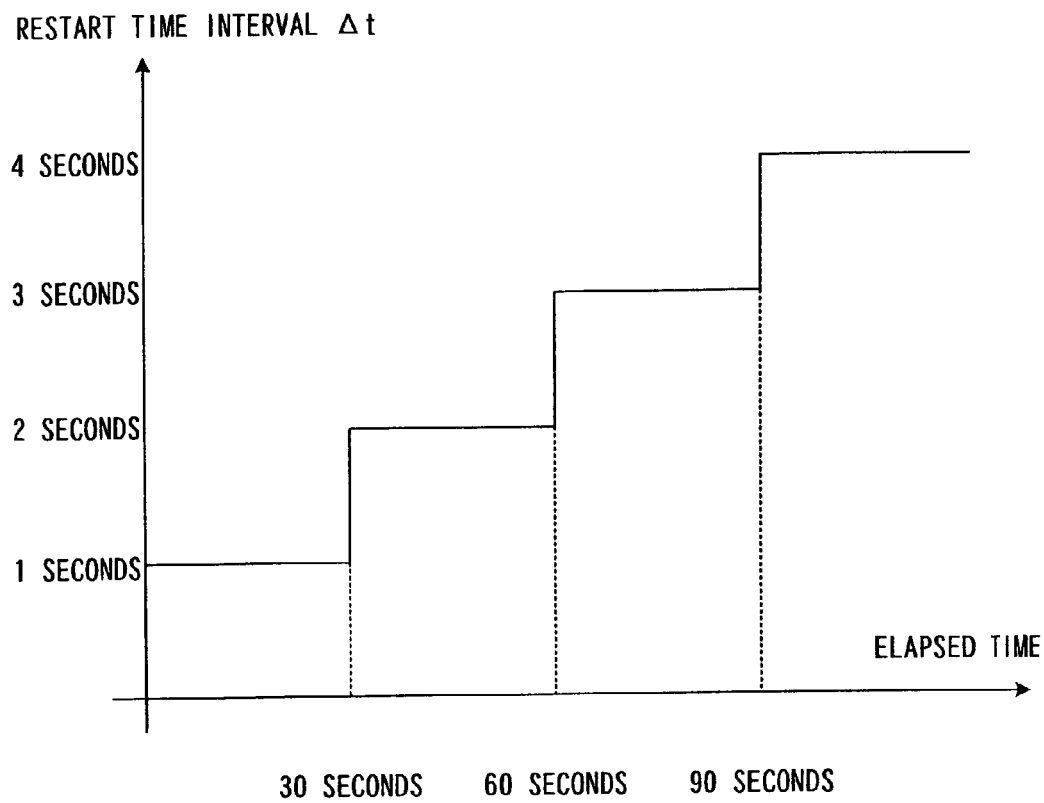
FIG. 16 illustrates the relationship between the length of elapsed time and the restart time intervals.
Figure 17:
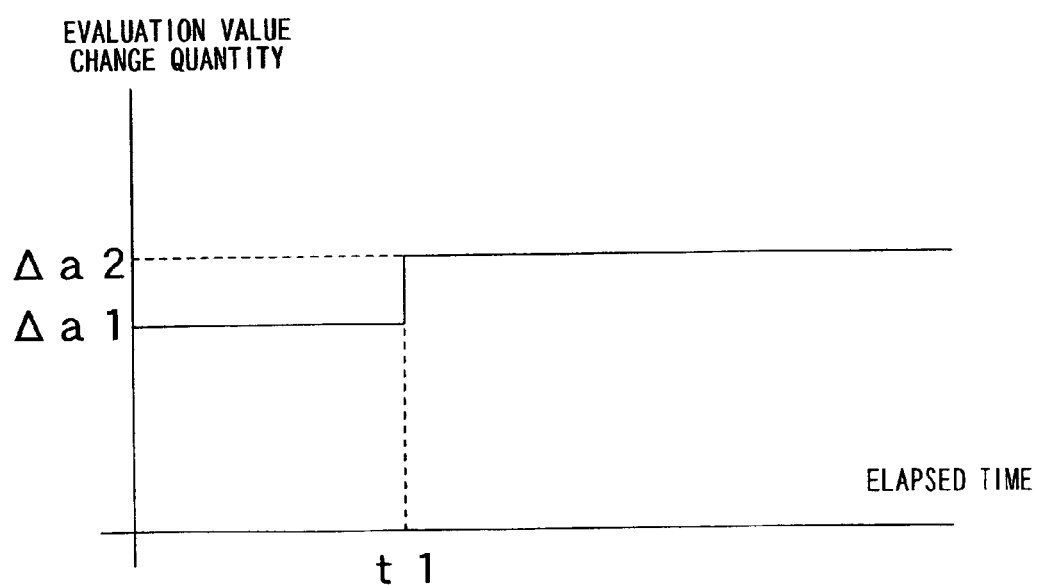
FIG. 17 illustrates the relationship between the length of elapsed time and the extent of change in the evaluation value.
Figure 18:
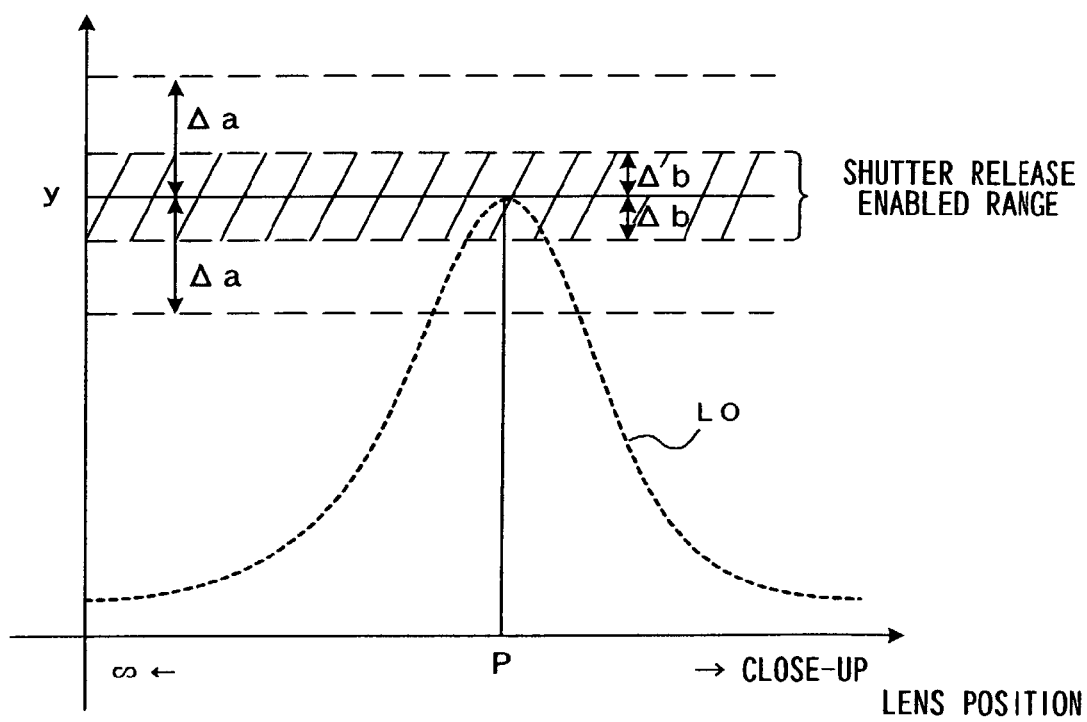
FIG. 18 illustrates the shutter release enabled range.

The following is an explanation on an example in which the time interval and the restart level are set in conformance to the length of elapsed time counted at the timer 1127. Methods that may be adopted to set the time interval and the restart level in conformance with the other conditions are to be detailed later. FIG. 16 illustrates the relationship between the length of elapsed time and the restart time interval. For instance, if the length of elapsed time is less than 30 seconds, the time interval is set to 1 second, and if the length of elapsed time is equal to or larger than 30 seconds and less than 60 seconds, the time interval is set to 2 seconds. In this manner, the time interval is lengthened by 1 second in correspondence to every thirty-second increase in the length of elapsed time. In other words, as the length of elapsed time increases, a restart occurs less frequently. FIG. 17 illustrates the relationship between the length of elapsed time and the extent of change in the evaluation value. The reference change quantity $\Delta a2$ after a length of time t1 elapses is set larger than a reference change quantity $\Delta a1$ before the time t1 elapses. Thus, a restart does not occur as readily after the length of time t1 elapses. It is to be noted that as shown in FIG. 18, a reference change quantity $\Delta a$ ($=\Delta a1$, $\Delta a2$) is set so as to achieve $\Delta a = K1 \cdot y$ in conjunction with the peak value y in the focus state. K1 represents a constant that satisfies K1<1.

Next, in step S139, a decision is made as to whether or not it is necessary to restart the operation. Examples of methods that may be adopted in this decision-making are presented in FIGS. 6~8. In the example presented in FIG. 6, the decision as to whether or not it is necessary to restart the operation is made in conformance to whether or not the restart time interval $\Delta t$ has elapsed. If it is decided in step S139 that $\Delta t$ has not yet elapsed, the operation returns to step S131, whereas if it is decided that $\Delta t$ has elapsed, the operation proceeds to step S140. In the example presented in FIG. 7, step S139 in FIG. 5 includes two procedural steps, i.e., step S1391 and step S1392. The calculation of the focus evaluation values is executed constantly based upon signals output from the CCD 103, and in step S1391, a decision is made as to whether or not the focus evaluation values being calculated constantly have changed by the reference change quantity $\Delta a$ or more relative to the focus evaluation value peak stored in the storage unit 1123.

Figure 19:
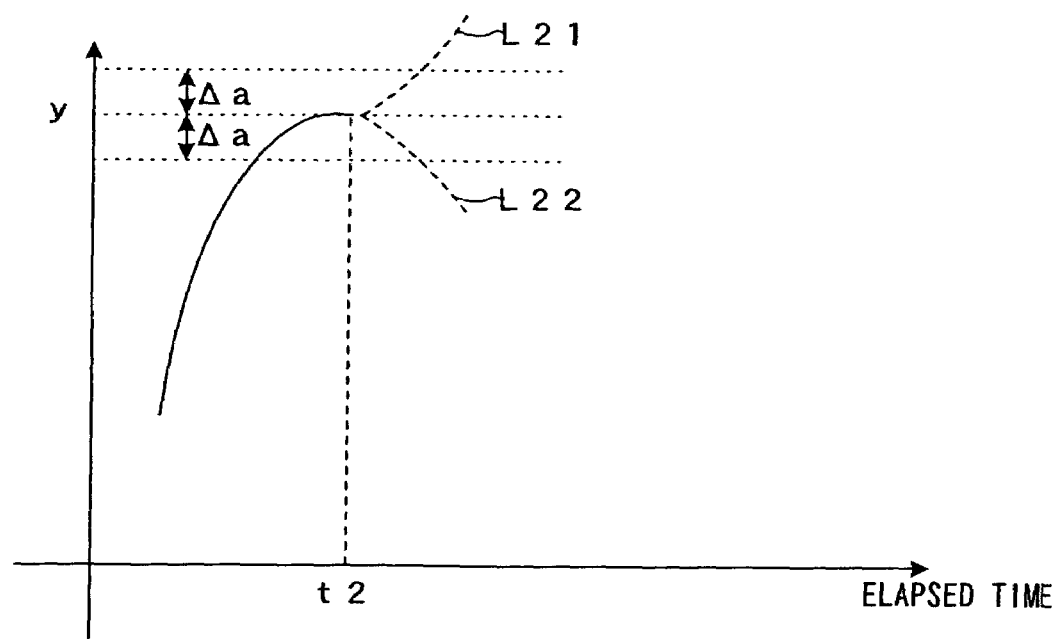
FIG. 19 illustrates the change in the focus evaluation value occurring over time.

FIG. 19 illustrates the time-variable change of focus evaluation values, with the vertical axis representing the focus evaluation value and the horizontal axis representing the time. The lens is moved to the focus evaluation value peak position, and the lens drive is stopped at a time point t2. If the subject moves after the time point t2, the focus evaluation value changes as indicated by L 21 or L 22. Then, when it is decided in step S1391 in FIG. 7 that the focus evaluation value has changed by the reference change quantity $\Delta a$ or more, the operation proceeds to step S140 in FIG. 5, whereas if the extent of the change is determined to be less than the reference change quantity $\Delta a$, the operation proceeds to step S1392. In step S1392, a decision is made as to whether or not the restart time interval $\Delta t$ has elapsed, and if it is decided that the restart time interval has elapsed, the operation proceeds to step S140, whereas if it is decided that the restart time interval has not elapsed yet, the operation returns to step S131.

FIG. 8 presents a third example of the decision-making method, in which step S139 includes two procedural steps, i.e., step S1393 and step S1394. In step S1393, a decision is made as to whether or not the restart time interval Δt has elapsed, and the operation proceeds to step S1394 if it is decided that the restart time interval has elapsed, whereas the operation returns to step S131 if it is decided that the restart time interval has not yet elapsed. In step S1394, a decision is made as to whether or not the current focus evaluation values have changed by the reference change quantity Δa or more relative to the focus evaluation value peak stored in the storage unit 1123. If it is decided in step S1394 that a change by the reference change quantity Δa or more has occurred, the operation proceeds to step S140, whereas if it is decided that a change by that extent has not occurred, the operation returns to step S131. It is to be noted that the reference change quantity Δa used in step S1391 and step S139 is Δa1 until the length of elapsed time counted at the timer 1127 reaches the time point t1 and once the elapsed time reaches t1, the reference change quantity Δa1 changes to Δa2, as shown in FIG. 17.

Figure 20:
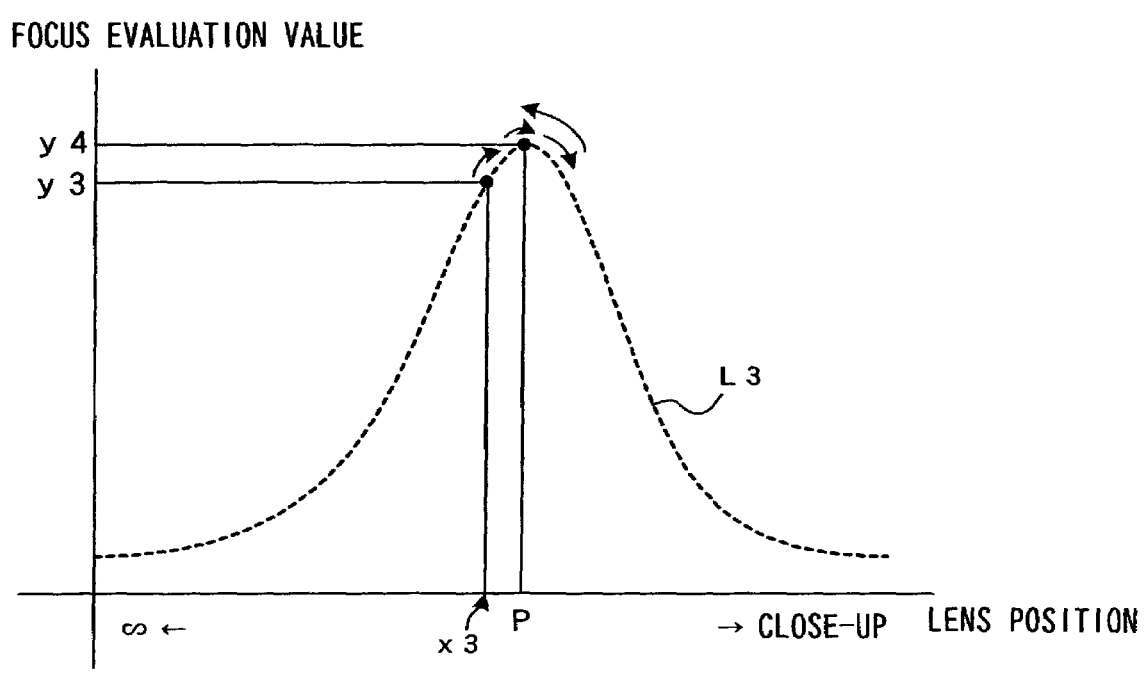
FIG. 20 illustrates the concept of the hill-climbing focusing operation.

If the operation proceeds to step S140 after deciding in step S139 that a restart is necessary, the hill-climbing focusing operation of the known art is executed in step S140. In FIG. 20, which illustrates the concept of the hill-climbing focusing operation, L3 indicates the curve of focus evaluation values that will be obtained for a subject. x3 indicates the lens position at the hill-climbing start with y3 representing the focus evaluation value corresponding to the lens position. After the focusing operation is started, the lens is moved toward, for instance, the close-up side and a focus evaluation value is calculated at the new position. Since the focus evaluation value thus obtained is larger than the focus evaluation value at the lens position x3 in FIG. 20, the focus position P is determined to be on the close-up side. When the lens is moved in a direction along which the focus evaluation value increases in this manner, the focus evaluation value becomes smaller once the lens moves beyond the focus position P. Since the peak value of the focus evaluation value thus far calculated is y4, the lens position P corresponding to y4 is estimated to be the focus position and, accordingly, the lens is moved to the position corresponding to the focus evaluation value y4. In other words, the hill-climbing focusing operation is that a focus evaluation value peak is ascertained by moving the photographic lens, or more specifically, the focusing lens in the direction along which the focus evaluation value increases during each focus evaluation value calculation cycl.

It is to be noted that during the hill-climbing focusing operation processing executed in step S140, the focus evaluation values may be weighted in correspondence to the focusing lens position as in step S116 or the focus evaluation values that have been calculated may be directly utilized without weighting.

In the following step S141, a decision is made as to whether or not the focus position has been determined and focus has been achieved. Since the focus position is not always determined through the hill-climbing operation executed in step S140, the operation proceeds to step S142 if it is decided that focus has not been achieved to move the focusing lens to a predetermined position, and then the operation returns to step S131. If, on the other hand, it is decided in step S141 that focus has been achieved, the operation returns to step S131. It is to be noted that the focus evaluation value data stored in the storage unit 1123 are replaced by the focus evaluation value data obtained during the hill-climbing focusing operation. The focusing evaluation value data obtained through the hill-climbing AF operation are stored in an area different from the area where the focus evaluation values obtained through the full range scan are stored in step S113.

If, on the other hand, the operation proceeds from step S132 to step S133, a decision is made in step S133 as to whether or not there are focus evaluation values within the shutter release enabled range. As shown in FIG. 18, the shutter release enabled range falls between y−Δb and y+Δb relative to the peak value y. Δb is set to K2·y. K2 is a constant which satisfies K2<K1. It is to be noted that a restart is executed as described later if the focus evaluation value is equal to or less than y−Δa or equal to or larger than y+Δa relative to the peak value y.

If it is decided in step S133 that the focus evaluation value is within the shutter release enabled range, the operation returns to step S124 in FIG. 4, whereas if it is decided that the focus evaluation value is outside the shutter release enabled the operation proceeds to step S134 in which a hill-climbing operation similar to that performed in step S140 is executed. In step S135, a decision is made as in step S141 as to whether or not focus has been achieved through the hill-climbing operation. If it is decided in step S135 that focus has been achieved, the operation proceeds to step S124 in FIG. 4, whereas if it is decided that focus has not been achieved, the operation proceeds to step S136 to move the lens to a predetermined position. Then, the operation proceeds to step S124 in FIG. 4.

It is to be noted that a restart is executed in the embodiment if the focus evaluation value falls outside the range with a predetermined width 2Δa centering around the evaluation value peak y, as shown in FIG. 18. Thus, the focusing operation can be restarted by the AF calculating unit 1126 if the photographic composition is changed by panning the camera and, as a result, the focus evaluation value increases. However, the operation may be restarted only when the evaluation value becomes lower than the y−Δa level without restarting the operation at all when the focus evaluation value increases, instead. In other words, the decision as to whether or not to execute a restart may be made in reference to the level set for lower focus evaluation values alone. With regard to the shutter release enabled range, too, the y−Δb level may be set as the shutter release enabled level so as to enable a shutter release only when the focus evaluation value is equal to or higher than of the shutter release enabled level.

As described above, since the restart time interval is lengthened by adjusting the restart time interval and the width 2Δa under photographing conditions in which the change in the focus position is relatively small or under photographing conditions in which the focus accuracy does not need to be very high in the embodiment, the battery power consumption necessitated when restarting the operation is reduced. In addition, when the battery power becomes reduced and thus, the voltage also becomes lowered, the restart interval is lengthened to achieve a similar advantage.

The shutter release enabled range described above, too, can be adjusted in conformance to various photographing conditions as is the time interval and the reference change quantity constituting the restart enabling conditions. It may be adjusted as described below, for instance.

(a) Photographing Mode

Since priority should be given to good focus in, for instance, the distant view photographing mode, the portrait photographing mode or the close-up photographing mode, in which the subject hardly moves or moves only slightly, the shutter release enabled range should be set narrower than in the normal photographing mode. In contrast, in the sports photographing mode for photographing a subject that is moving fast, priority should be given to the shutter release and, accordingly, the shutter release enabled range is set wider than in the normal photographing mode to readily allow a shutter release.

(b) Aperture Value at the Aperture 102

Since the depth of field increases as the aperture value becomes larger, the shutter release enabled range is set wider as the aperture value increases, i.e., as the aperture diameter becomes smaller.

(c) Subject Brightness

The shutter release enabled range should be set wider as the subject brightness becomes lower. For instance, when the subject brightness is lower than a predetermined value, it means that the subject is dark. In such a case, it is necessary to increase the length of the storage time at the CCD and, since this lowers the signal read rate, it takes a longer time to achieve focus after a restart. Accordingly, the shutter release enabled range is set wide under such conditions so as to enable a shutter release readily by disallowing frequent restarts.

(d) Number of Recording Pixels

In conformance to the number of recording pixels at the CCD 103 from which an image-capturing signal is extracted, the shutter release enabled range is set wide if the number of recording pixels is small, i.e., when the fineness of the image is compromised. Alternatively, the shutter release enabled range may be set in conformance to the compression rate instead of the number of recording pixels. For instance, when the compression rate is high, the shutter release enabled range should be set wider compared to that set when the compression rate is low (e) Full-aperture F Value of the Photographic Lens 101

Since the full-aperture F value changes during a zoom operation of the photographic lens 101, the shutter release enables range is set wider as the full-aperture F value increases. Since the full-aperture F value varies among different single focus lenses, the shutter release enabled range should be adjusted in correspondence to the F value of the lens which is currently mounted. The same principle applies when setting the shutter release enabled range for a camera having an integrated lens.

(f) Length of Elapsed Time Counted by the Timer 1127

The shutter release enabled range is narrowed as the length of elapsed time increases.

In the embodiment explained above, after focus is achieved following an ON operation of the halfway-press switch 1163, the lens is locked by effecting an AF lock in step S124 in FIG. 4. However, the lens does not need to be locked in some cases. A procedure that may be taken in such a situation is shown as a second embodiment in FIG. 22. It is to be noted that the procedure shown in FIG. 22 replaces the procedure in FIG. 5. Accordingly, in the procedure shown in FIG. 22, the processing through which the operation returns from (3) to step S124 in FIG. 5 is omitted.

Figure 22:
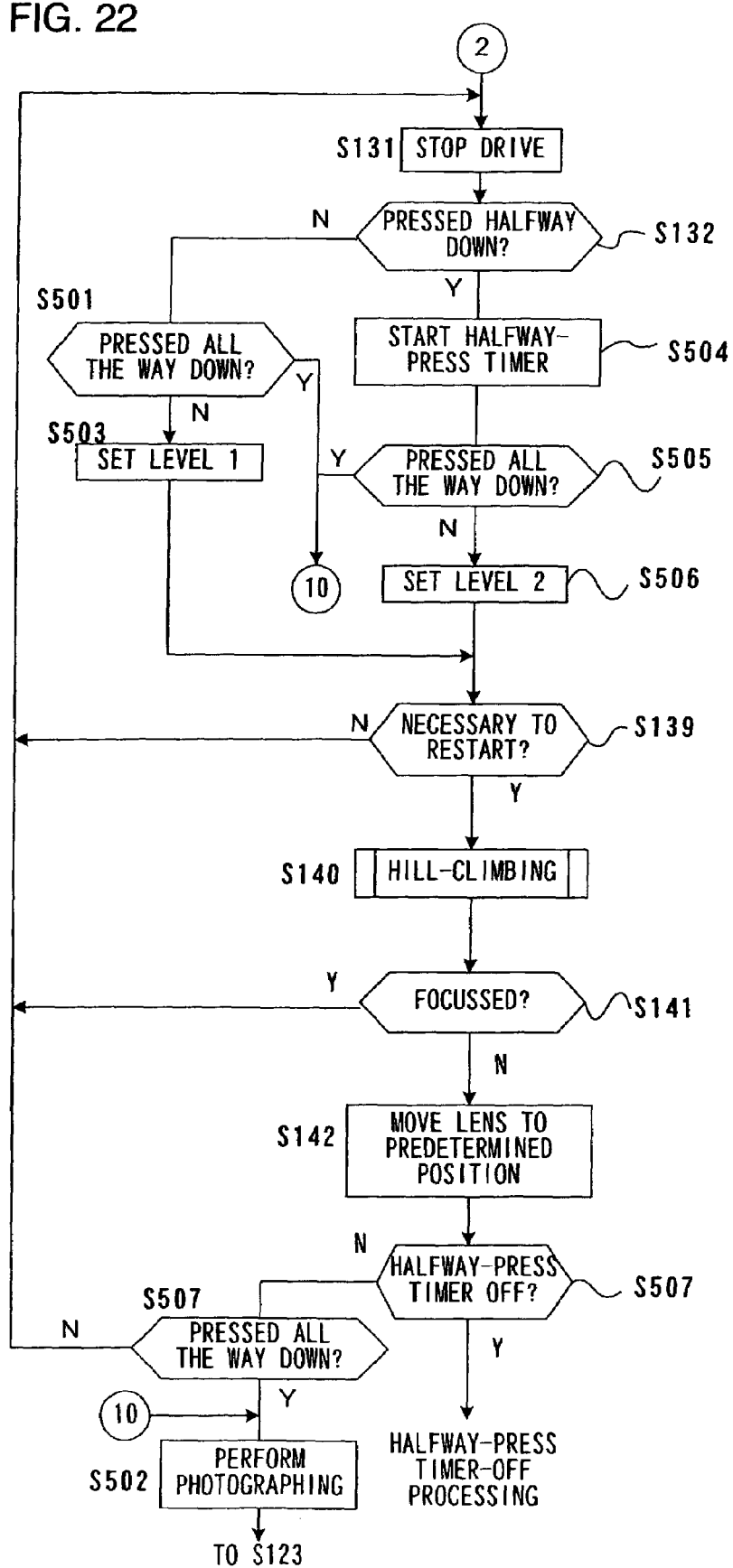
FIG. 22 presents a flowchart of the procedure implemented in a second embodiment, which corresponds to the procedure shown in FIG. 5.

The same step numbers are assigned to steps in FIG. 22 that are similar to those in FIG. 5, and the following explanation focuses on the features differentiating the second embodiment. After it is decided in step S132 that the halfway-press switch 1163 is in an OFF state, a decision is made in step S501 as to whether or not the full-press switch 1162 has been turned on. If the full-press switch 1162 has been turned on, photographing operation processing is executed in step S502 and then the operation returns to step S123 in FIG. 4. However, the operation proceeds to step S503 if the full-press switch 1162 is in an OFF state to set the reference change quantity Δa to Δa11 before proceeding to step S139.

If, on the other hand, it is decided in step S132 that the halfway-press switch 1163 has been turned on, a halfway-press timer is started in step S504. Then, if it is decided in step S505 that the full-press switch 1162 has been turned on, the photographing operation processing is executed in step S502 before the operation returns to step S123 in FIG. 4. If the full-press switch 1162 is in an OFF state, the operation proceeds to step S506 to set the reference change quantity Δa to Δa12 (<Δa11) before proceeding to step S139. Since an on state of the halfway-press switch 1163 indicates an intent to perform a photographing operation, the reference change quantity Δa is reduced to restart the focusing operation readily. As a result, the subject can be photographed with even better focus. In contrast, an off state of the halfway-press switch 1163 indicates that the photographer does not intend to perform a photographing operation and, accordingly, the focusing operation is not restarted readily to reduce the battery power consumption.

If it is decided in step S141 that focus has not been achieved through the hill-climbing focusing operation, the focusing lens is moved to a predetermined position in step S142. Then, in step S507, a decision is made as to whether the full-press switch 1162 is in an on state or an OFF state if it is decided that a time-up has occurred at the halfway-press timer. If the full-press switch 1162 has been turned on, the photographing operation processing is executed in step S502 before the operation returns to step S123 in FIG. 4. If it is decided in step S507 that at time-up has occurred, the operation shifts to halfway-press timer-off processing.

Figure 23:
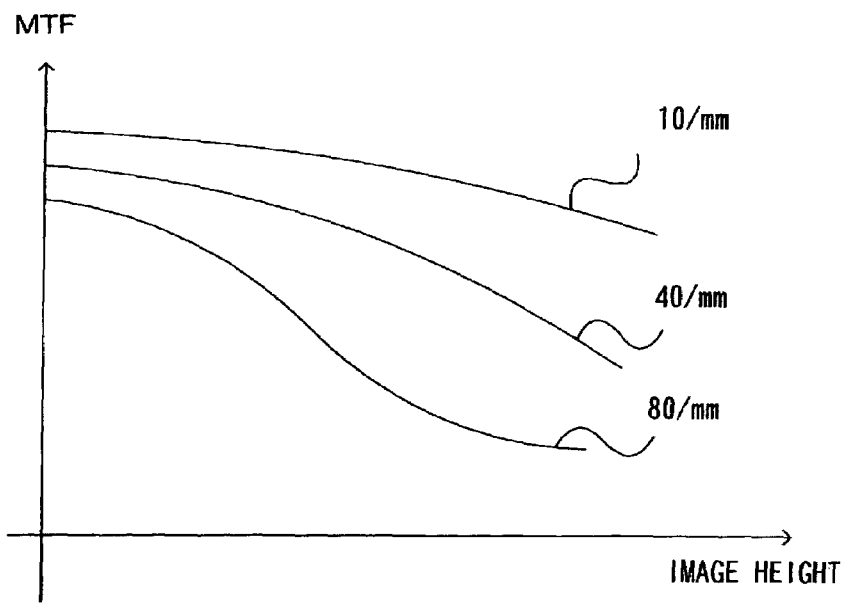
FIG. 23 illustrates the image height-MTF characteristics of photographic lens obtained by using the spatial frequency as a parameter.
Figure 24:
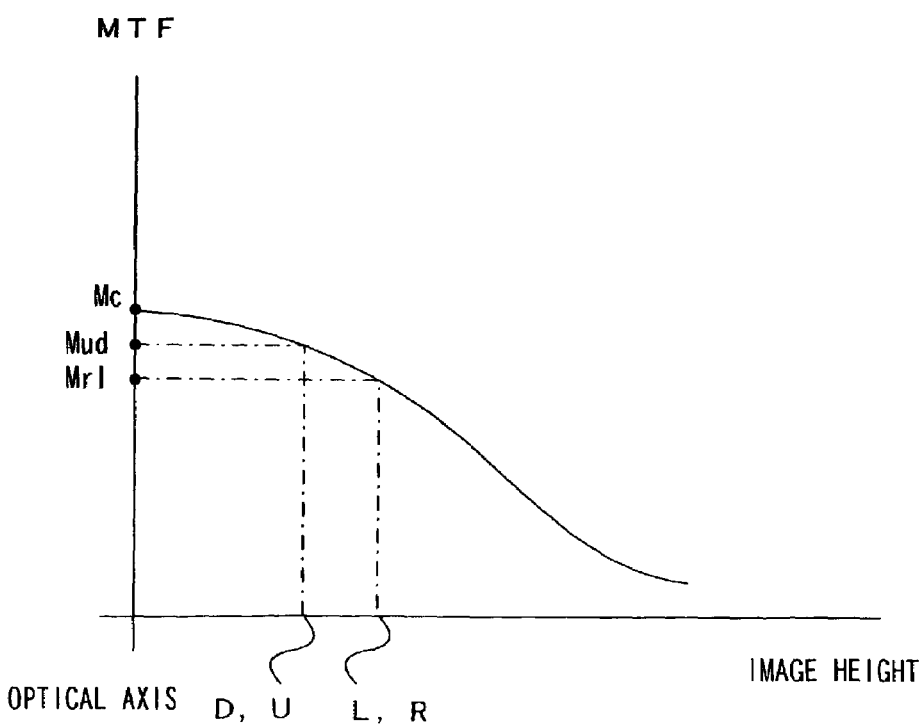
FIG. 24 illustrates the image height-MTF characteristics of the photographic lens that manifest in correspondence to a specific spatial frequency.

As explained in reference to FIG. 21, five focus detection areas can be set in the hill-climbing AF camera according to the present invention. The light fluxes that enter the five focus detection areas pass through different areas of the photographic lens 101, and they are the type of light fluxes that is compatible with the MTF (modulation transfer function) characteristics inherent to the photographic lens 101. As shown in FIG. 23, the MTF characteristics of exchangeable lenses become diminished as the image height increases, and they manifest different tendencies depending upon the spatial frequency (10/mm, 40/mm etc., in FIG. 23) and the direction. Namely, the photographic lens 101 manifests varying MTF characteristics in correspondence to the on-axis focus detection area C, the right and left off-axis focus detection areas R and L and the up and down off-axis focus detection areas U and D. A further explanation is given in reference to FIG. 24 illustrating the MTF characteristics corresponding to a given spatial frequency. Mc indicates the MTF characteristics corresponding to the on-axis focus detection area C, Mr1 indicates the MTF characteristics manifesting at the right and left off-axis focus detection areas R and L and Mud indicates the MTF characteristics manifesting at the up and down off-axis focus detection areas U and D.

Figure 25:
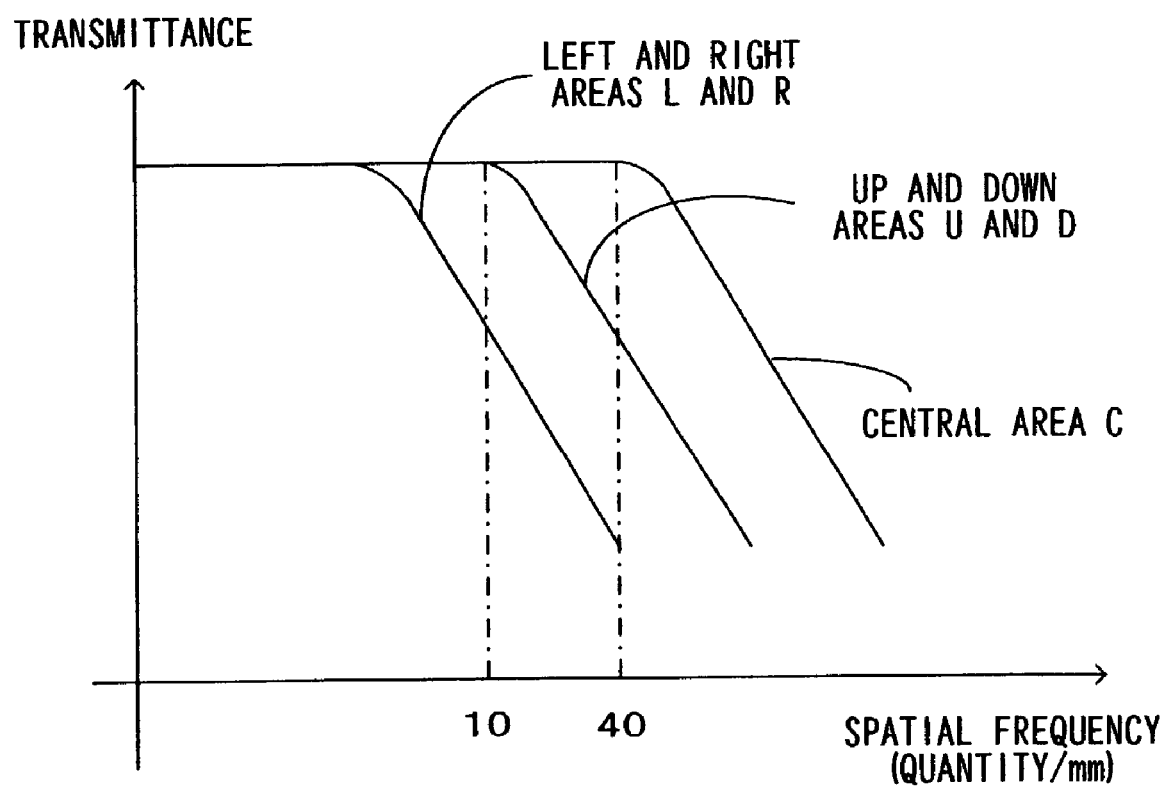
FIG. 25 shows the spatial frequency-transmittance characteristics obtained by using the focus detection areas as a parameter.

As explained earlier in the description of the related art, when a focus detection is performed by using a uniform reference pattern, the transmittance at a focus detection area varies depending upon the MTF characteristics. FIG. 25 illustrates the relationship between the spatial frequency and the transmittance ascertained by using the different focus detection areas as a parameter. Since different spatial frequency characteristics manifest among the individual focal length areas, the focus evaluation values that are calculated, too, are different among the individual focus detection areas. Accordingly, different digital filter coefficients are set at the band pass filters for the individual areas. More exactly, the band pass filters are utilized by selecting one of three types of digital filter coefficients for each of; the area C, the areas R and L and the areas U and D, in order to improve the accuracy of the AF performed based upon the focus evaluation values calculated in conformance to the MTF characteristics.

Figure 26:
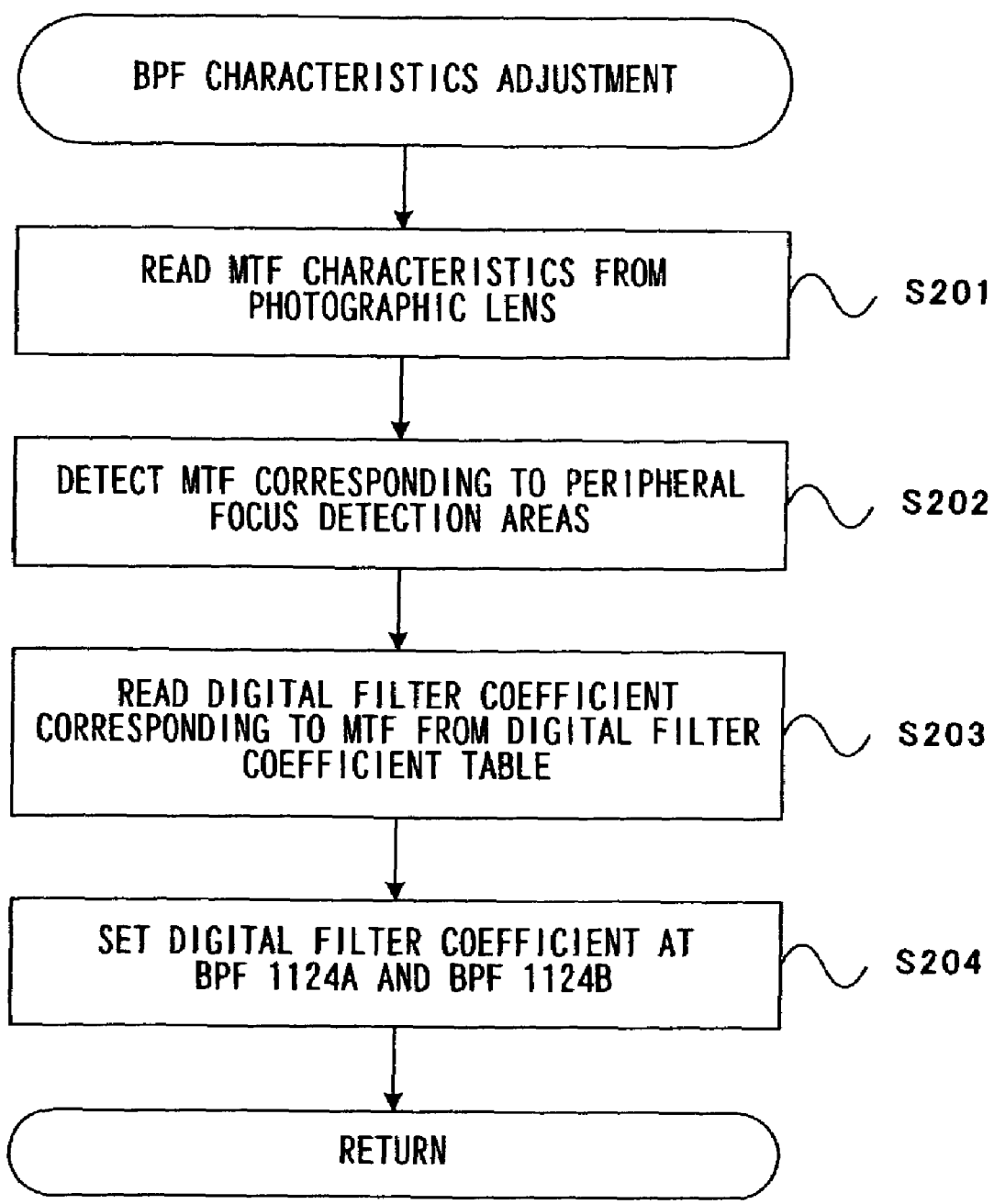
FIG. 26 shows the procedure implemented to set a digital filter coefficients for the plurality of focus detection areas set in the photographic image plane.

A selection is made from the three types of digital filter coefficients as described below. In the ROM at the photographic lens 101, the MTF characteristics inherent to the photographic lens 101 shown in FIG. 24 are stored. An electric contact point is provided on the camera side at the lens mounting unit where the photographic lens is mounted and the MTF characteristics data in the ROM are detected via this contact point. A table of digital filter coefficients corresponding to varying MTF is stored in the storage unit 1123 at the camera main body. A digital filter coefficient is set at the BPFs 1124A and 1124B on the camera main body side, as shown in the flowchart presented in FIG. 26.

In step S201, the MTF characteristics shown in FIG. 24 are read from the ROM at the photographic lens 101. In step S202, the MTF is calculated in correspondence to the image height in off-axis peripheral focus detection areas. In step S203, the digital filter coefficient corresponding to the calculated MTF is read out from the table stored in the storage unit 1123 at the CPU 112. In step S204, the digital filter coefficient thus read out is set at the BPF 1124A and the BPF 1124B.

Let us assume that focus evaluation values with regard to a given subject are calculated by using a single filter. In this case, an output L102 from a peripheral focus detection area is lower than an output L101 from the central focus detection area as shown in FIG. 27.

Figure 27:
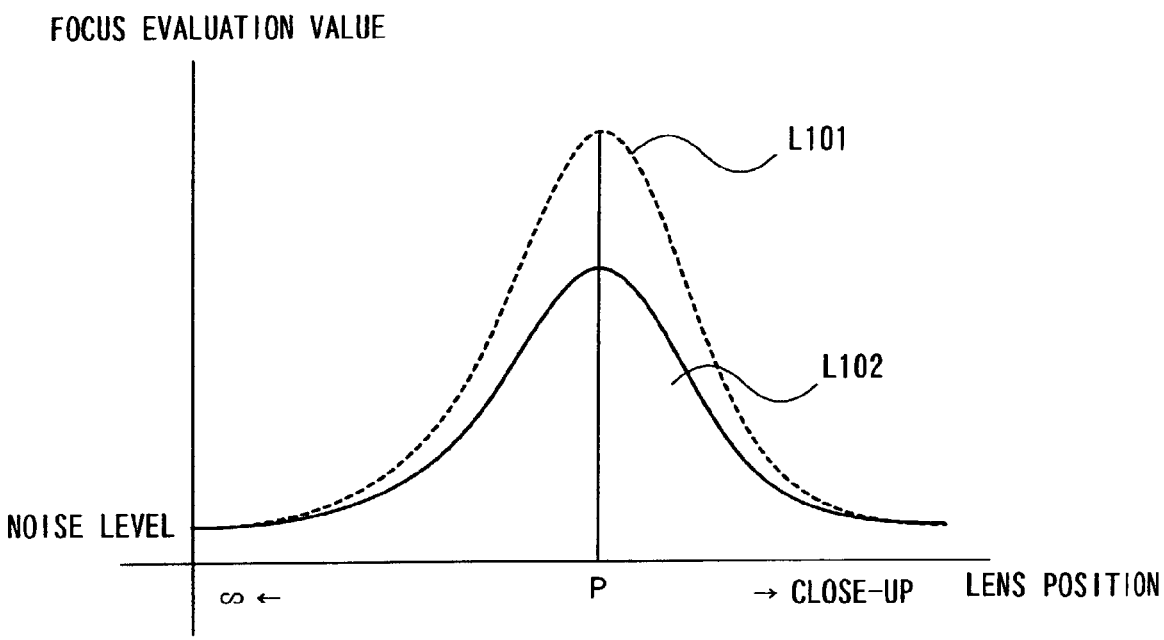
FIG. 27 shows the focus evaluation value obtained through a filtering process implemented in correspondence to the MTF characteristics of the photographic lens.

Accordingly, when calculating the focus evaluation values for the on-axis focus detection area C, such a digital filter coefficient is set at the BPFs 1124A and 1124B that the focus evaluation values corresponding to the on-axis focus detection area C each achieve characteristics represented by the solid line L102 on FIG. 27. By adjusting the BPF characteristics in this manner, the effect of the MTF characteristics can be eliminated when comparing the focus evaluation values for the plurality of focus detection areas. It is to be noted that the adjustment of the BPF characteristics achieved by using different digital filter coefficients is equivalent to narrowing their band pass range.

Figure 28:
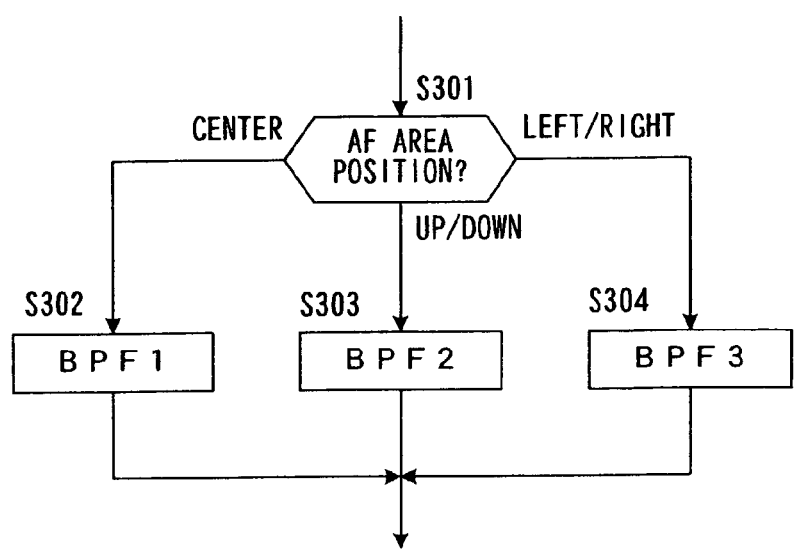
FIG. 28 shows the procedure implemented to individually select the BPF in correspondence to each of the plurality of focus detection areas set in the photographic image plane.

In a camera which does not use an exchangeable photographic lens 101, a BPF to be used is selected from BPFs 1~3 through the process in the flowchart presented in FIG. 28. In step S301, an area for which the focus evaluation values are to be calculated is determined. If it is decided that the focus evaluation values are to be calculated for the central focus detection area C, the operation proceeds to step S302 to select the BPF 1. If it is decided that the focus evaluation values are to be calculated for the up and down focus detection areas D and U, the operation proceeds to step S302 to select the BPF 2. If it is decided that the focus evaluation values are to be calculated for the right and left focus detection areas R and L, the operation proceeds to step S303 to select the BPF 3. Digital filter coefficients at which image signals in predetermined spatial frequency bands different from one another are filtered are each set at one of the BPFs 1~3 in advance. It is to be noted that since the lens MTF characteristics also change in conformance to the focal length of the photographic lens 101, the digital filter coefficients should be set by taking into consideration the focal length as well.

Figure 29:
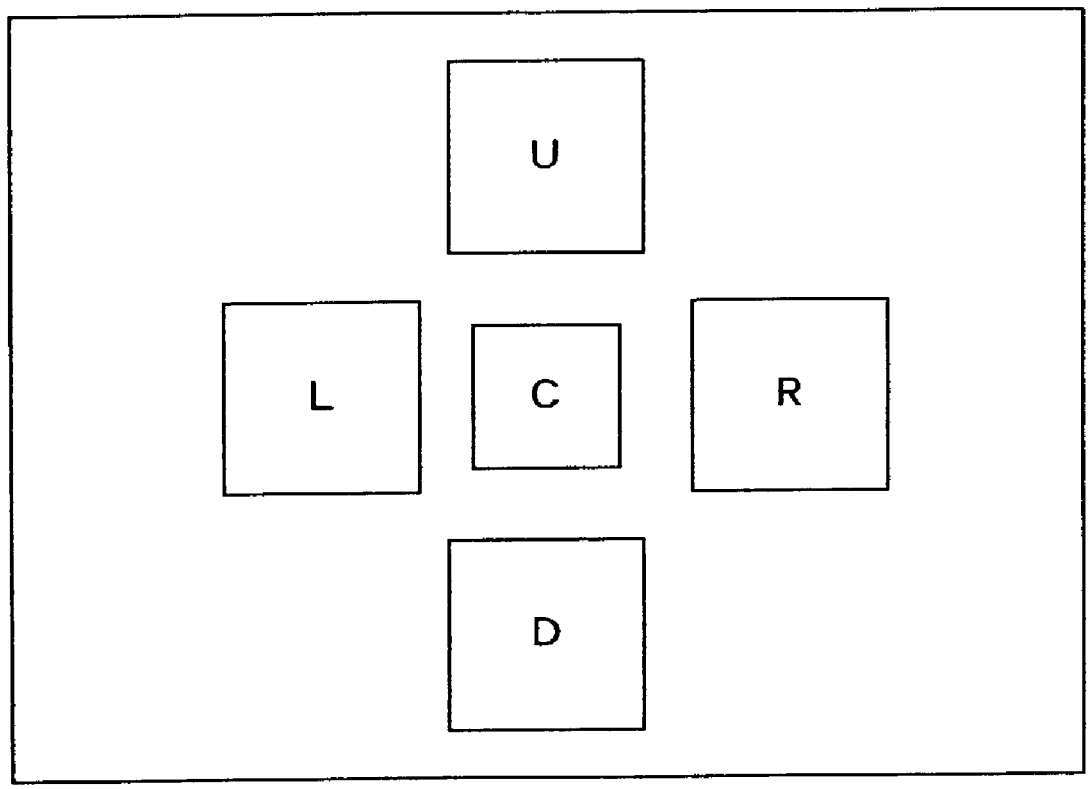
FIG. 29 shows the sizes of the focus detection areas set in conformance to the MTF characteristics of the photographic lens.

Instead of changing the digital filter coefficient, the size of the peripheral focal length areas may be increased in conformance to the MTF characteristics as shown in FIG. 29. In this case, too, the MTF characteristics are read from the ROM at the exchangeable lens, and the MTF corresponding to the image height in the focus detection areas, e.g., Mr1 or Mud, is read. Then, the size of the focus detection areas is set in conformance to the level of the MTF. In the case of a fixed lens, the size of the peripheral focus detection areas is predetermined. It is to be noted that the central point in each of the focus detection areas R and L and the central point in each of the focus detection areas U and D match the central point in each of the focus detection areas R and L and the central point in each of the focus detection areas U and D in FIG. 21.

Alternatively, focus evaluation values calculated by using a uniform digital filter coefficient set at the BPFs for the focus detection areas having a uniform size may be multiplied by correction coefficients (weighting coefficients) corresponding to reciprocals of the MTF characteristics. In other words, the weighting quantity for a focus detection area with a low MTF is set larger than the weighting quantity for a focus detection area with a high MTF in this manner.

The restart operation for the focusing lens in a camera having the multiple point autofocus areas shown in FIG. 21 is now explained. An explanation has been given on an example in which a specific reference change quantity Δa representing the restart level range is set in conformance to the various photographing conditions in step S138 in FIG. 5 and a restart is executed if the focus evaluation value manifests a deviation larger than the reference change quantity Δa in step S139 in reference to FIGS. 7 and 8. This restart operation may be executed by constantly monitoring the focus evaluation values in a preselected focus detection area. However, a restart may be executed based upon the following algorithms when multipoint autofocus areas are present in the camera, instead.

1) A restart is executed if one of the focus evaluation values calculated in correspondence to the individual focus detection areas other than the selected focus detection area manifests a predetermined extent of change following the completion of the focusing operation.
2) A restart is executed if one of the focus evaluation values corresponding to the individual focus detection areas other than the selected focus detection area manifests a change, the rate of which is equal to or larger than a predetermined rate relative to the focus evaluation value calculated for the selected focus detection area following the completion of the focusing operation.
3) A restart is executed if one of the focus evaluation values corresponding to the individual focus detection areas other than the selected focus detection area manifests a change, the rate of which is equal to or larger than a predetermined rate following completion of the focusing operation.
4) A restart is executed if one of the absolute values of the focus evaluation values corresponding to the individual focus detection areas other than the selected focus detection area manifests a change by a predetermined extent following completion of the focusing operation.

Since the focusing operation is restarted if a focus evaluation value within a focus detection area other than the selected focus detection area fluctuates when there are a plurality of focus detection areas, a focal adjustment on the main subject can be achieved with ease.

Figure 30:
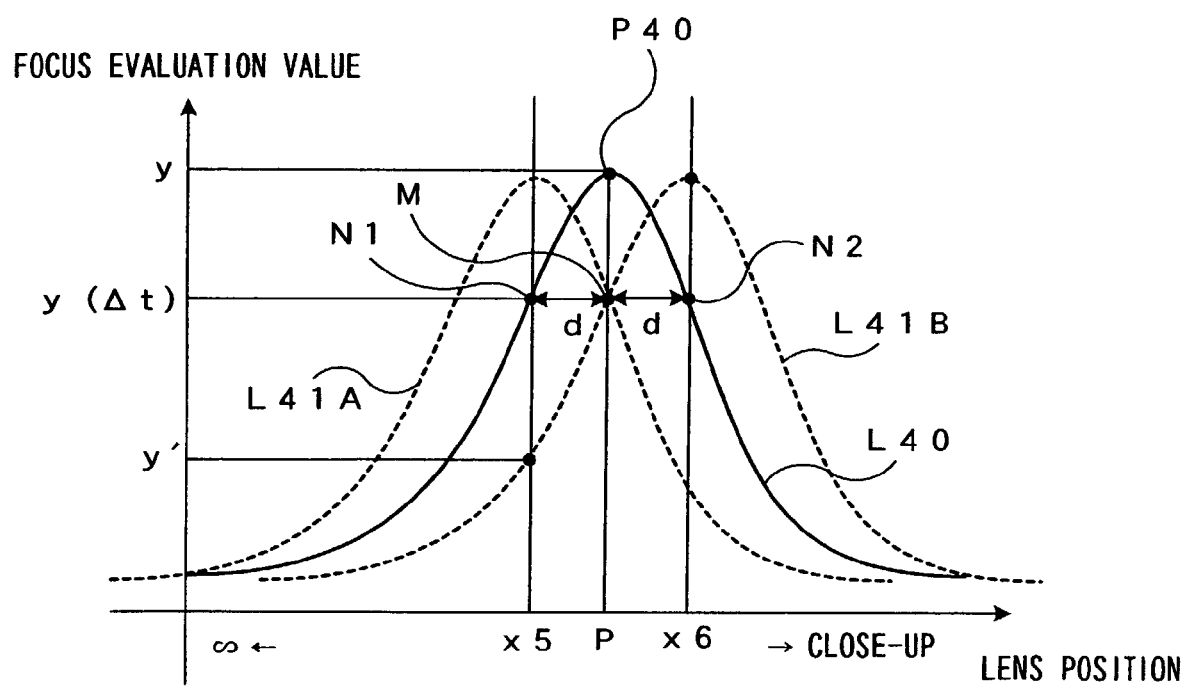
FIG. 30 illustrates another type of hill-climbing focusing operation.

It is to be noted that a hill-climbing focusing operation shown in FIG. 30 can be executed in combination with the hill-climbing focusing operation in the related art shown in FIG. 20. The dots on FIG. 30 each indicate a focal adjustment state at the photographic lens 101, which is determined in correspondence to the lens position and the focus evaluation value. A curve L40 is the focus evaluation value curve obtained at the focusing operation completion, with P40 indicating the peak of the curve L 40 and y indicating the focus evaluation value at the peak. Since the lens drive is stopped upon completion of the focusing operation and the lens position is held at P, the dot indicating the focal adjustment state moves parallel to the vertical axis if the focus evaluation value changes. A dot M represents the focal adjustment state after the restart time interval Δt elapses following the focusing operation completion, manifesting a change in the focus evaluation value alone from y to y(Δt) with the lens position remaining unchanged.

If the distance to the subject changes very slightly, the focus evaluation value curve L41A or L41B obtained after the change is expected to have a shape very similar to that of the focus evaluation value curve L40, with its peak position shifted either to the left or to the right relative to the position P in the figure. Accordingly, in this embodiment, if the focus evaluation value y(Δt) is obtained when the restart time interval Δt has elapsed, the corresponding focus evaluation value curve is assumed to be either L41A or L41B. Then, the focusing lens is moved to the peak position x5 or x6 of the curve L41A or L41B to restart the hill-climbing focusing operation from the new lens position.

The focus evaluation value data (the lens positions and the focus evaluation values) represented by the curve L40 are stored in the storage unit 1123 at the completion of the focusing operation. The lens position corresponding to the largest focus evaluation value among the various focus evaluation values in the data is the position P, and the lens position corresponding to the focus evaluation value (the focus evaluation value at a dot N1 or N2) equal to (or roughly equal to) the focus evaluation value y (Δt) at the dot M is the peak position x5 or x6. When the absolute value of the difference between the position P and the position x5 or x6 is d, the lens should be moved by the distance d toward the infinity side to restart the focusing operation if the assumed focus evaluation curved is L41A, whereas the lens should be moved by the distance d toward the close-up side to restart the focusing operation if the assumed focus evaluation value curve is L41B.

The different hill-climbing operations shown in FIGS. 20 and 30 should be executed as explained below. For instance, the method shown in FIG. 30 may be adopted during the initial hill-climbing operation performed in step S140 in FIG. 5, with the method in FIG. 20 adopted in the subsequent hill-climbing operation performed repeatedly. Alternatively, the method in FIG. 30 may be adopted if the difference between the focus evaluation value obtained at the restart and the peak of the evaluation values stored in the storage unit 1123 is equal to or larger than a predetermined level, with the method in FIG. 20 adopted when the difference is smaller than the predetermined level.

It is to be noted that the focus evaluation value data obtained through the hill-climbing focusing operation are stored into the storage unit 1123 separately from the data obtained through the full range sampling operation that are stored in memory in step S113. The data obtained through the hill-climbing focusing operation and then stored into the storage unit 1123 are updated with the latest data each time the hill-climbing focusing operation is performed. In addition, the data stored in memory that constitute the curve L40 are mostly data corresponding to positions close to the peak, and the profile corresponding to the middle range and lower range are estimated based upon the data obtained and stored into the storage unit 1123 in step S131.

It is to be noted that if the focus evaluation value that is calculated after starting a hill-climbing focusing operation by assuming the focus evaluation value curve is L41A and accordingly moving the lens by the distance d toward the infinity side is y' which is smaller than y(Δt), it should be deduced that the actual evaluation value curve is similar to the curve L41B, and thus, the lens should be immediately moved by a distance 2d toward the close-up side to start the hill-climbing focusing operation from the readjusted position. When the focusing operation is restarted after moving the lens by the distance d in this manner, the hill-climbing operation can be started from a point at least close to the peak position even if the shape of the actual focus evaluation value curve is somewhat different from the shape of the curve L40. As a result, focus can be achieved within a shorter length of time to enable quick focus.

As explained above, in the camera achieved in the embodiments, which allows the specific length of time representing the restart time interval to be adjusted when restarting the focusing operation after focus is achieved, a restart is executed only when it is necessary in conformance to the photographing conditions and the camera state. As a result, the frequency with which the focusing operation is restarted is reduced to achieve a reduction in the extent of battery depletion necessitated by restarts.

In addition, by adjusting the specific length of time representing the restart time interval in correspondence to the photographing conditions and the camera state, it becomes possible to avoid wasteful consumption of the battery attributable to restarting.

Furthermore, by varying the width of the evaluation value range over which the focusing operation is not restarted in conformance to various conditions, the restart frequency is lowered when, for instance, photographing a landscape in which the subject hardly moves or when the aperture value is large and the depth of field is great and, as a result, wasteful consumption of the battery attributable to unnecessary restarts can be minimized.

In addition, since the focusing operation is executed based upon the focus evaluation values calculated following the completion of the previous focusing operation and a shutter release is enabled when the focal adjustment state is determined to be within an acceptable range based upon the focus evaluation values, a photograph with good focus can be achieved. In particular, by applying rigorous restrictions with regard to restarts based upon the focus evaluation values, a photograph with good focus can be taken while preventing unnecessary battery depletion.

Since a focusing operation is executed based upon the focus evaluation values calculated after the completion of the previous focusing operation and the conditions for restarting the focusing operation are adjusted in conformance to whether or not the photographing preparation command has been issued, an ideal focusing operation that reflects the intent of the photographer can be performed.

Moreover, since the distance by which the photographic lens is to be moved for a restart is set in conformance to the focus evaluation values and the lens positions stored in the storage unit and the focus evaluation values obtained at the time of the restart, the focusing operation can be restarted from a lens position closer to the focus evaluation value peak. As a result, the length of time required to achieve a focus can be reduced to enable quick focus.

While an explanation is given a reference to the embodiments on an example in which the present invention is adopted in a digital camera that uses an exchangeable lens, the present invention may be adopted in a digital camera that uses an integrated lens. The present invention may also be adopted in a silver halide film camera as long as a subject image is captured by an image-capturing element and an AF operation is executed through the contrast method. It is to be noted that the present invention may also be adopted in conjunction with a single focus lens.

Furthermore, the present invention may be adopted in a portable telephone or a portable terminal having a CCD camera or the like or a video camera that handles dynamic images as well. In other words, the present invention may be adopted in any of various types of cameras that include an image-capturing element and perform a focusing operation through the contrast method.

The above described embodiments are examples, and various modifications can be made without departing from the spirit and scope of the invention.

What is claimed is:

1. A camera comprising:
an image-capturing element that captures a subject image through a photographic lens;
an evaluation value calculation unit that calculates a focus evaluation value based upon an image-capturing signal output from the image-capturing element;
a focusing operation unit that performs a focusing operation at the photographic lens based upon the focus evaluation value;
a decision-making unit that makes a decision as to whether or not a focus evaluation value calculated by the evaluation value calculation unit manifests a change by an extent larger than a predetermined value relative to a focus evaluation value calculated at a focusing operation end after a predetermined length of time has elapsed following the focusing operation end;
a restart unit that enables the focusing operation unit in a focusing operation when the decision-making unit decides that the change by the extent larger than the predetermined value has occurred; and
a time adjustment unit that changes the predetermined length of time.

2. A camera according to claim 1, further comprising:
a determining unit that determines a time changing condition in conformance to which the predetermined length of time is changed by the time adjustment unit, wherein:
the time adjustment unit changes the predetermined length of time in conformance to the time changing condition determined by the determining unit.

3. A camera according to claim 2, wherein:
the determining unit determines the time changing condition so as to set the predetermined length of time in correspondence to a photographing condition or a camera state.

4. A camera according to claim 3, wherein:
the photographing condition is a focal length of the photographic lens; and the determining unit determines the time changing condition so as to lengthen the predetermined length of time as the focal length increases.

5. A camera according to claim 3, wherein:
the photographing condition includes a first photographing mode suited for photographing a subject that moves slightly or almost not at all and a second photographing mode suited for photographing a subject that moves faster than the subject in the first photographing mode; and
the determining unit determines the time changing condition so as to shorten the predetermined length of time in the second photographing mode compared to the predetermined length of time set in the first photographing mode.

6. A camera according to claim 5, wherein:
the first photographing mode includes at least one of a normal photographing mode, a distant view photographing mode, a portrait photographing mode, a close-up photographing mode and a night photographing mode and the second photographing mode includes at least a sports photographing mode.

7. A camera according to claim 3, further comprising:
an aperture that is operated to adjust a quantity of subject light entering the image-capturing element, wherein:
an aperture value set at the aperture constitutes the photographing condition; and
the determining unit determines the time changing condition so as to lengthen the predetermined length of time as the aperture value increases.

8. A camera according to claim 3, further comprising:
a photometering unit that detects a brightness of a predetermined area of the subject, wherein:
the brightness detected by the photometering unit constitutes the photographing condition; and
the determining unit determines the time changing condition so as to lengthen the predetermined length of time as the brightness becomes lower.

9. A camera according to claim 3, wherein:
the image-capturing element includes a plurality of pixels;
a number of recording pixels to be used for recording in data of the image captured by the image-capturing element can be varied;
the number of recording pixels constitutes the photographing condition; and
the determining unit determines the time changing condition so as to lengthen the predetermined length of time as the number of recording pixels becomes smaller.

10. A camera in according to claim 3, further comprising:
a full-aperture F value detection unit that detects a full-aperture F value of the photographic lens constituting the photographing condition, wherein:
the determining unit determines the time changing condition so as to lengthen the predetermined length of time as a larger full-aperture F value is detected.

11. A camera according to claim 3, further comprising:
a voltage detection unit that detects a voltage of a camera drive battery constituting the camera state, wherein:
the determining unit determines the time changing condition so as to lengthen the predetermined length of time as the voltage detected by the voltage detection unit becomes lower.

12. A camera comprising:
an image-capturing element that captures a subject image through a photographic lens;

an evaluation value calculation unit that calculates a focus evaluation value based upon an image-capturing signal output from the image-capturing element;
a focusing operation unit that performs a focusing operation at the photographic lens based upon the focus evaluation value;
a decision-making unit that makes a decision as to whether or not the focus evaluation value calculated after an end of the focusing operation is within a shutter release enabled range over which a photographing operation is enabled;
a shutter release enabling unit that enables the photographing operation in response to a photographing command if the decision-making unit decides that the focus evaluation value is within the shutter release enabled range;
a photographing unit that executes a photographing operation if a photographing command is output while a photographing operation is enabled by the shutter release enabling unit; and
a restart unit that enables the focusing operation unit in a focusing operation based upon the focus evaluation value calculated after the end of the focusing operation, wherein:
the decision-making unit performs a decision-making operation when a preparation signal for the photographing command is output; and
the restart unit executes a restart if the focus evaluation value deviates from the shutter release enabled range based upon results of the decision made by the decision-making unit.

13. A camera according to claim 12, wherein:
when the preparation signal for the photographing command is not output, the restart unit executes a restart if the focus evaluation value deviates from a restart disabled range which is different from the shutter release enabled range.

14. A camera according to claim 13, wherein:
the restart disabled range is wider than the shutter release enabled range.

15. A camera according to claim 13, further comprising:
a setting unit that sets the shutter release enabled range in conformance to a photographing condition.

16. A camera according to claim 15, wherein:
a focal length of the photographic lens is variable and the focal length constitutes the photographing condition; and
the setting unit sets the shutter release enabled range in correspondence to the focal length.

17. A camera according to claim 15, wherein:
the photographing condition includes a first photographing mode suited for photographing a subject that moves slightly or almost not at all and a second photographing mode suited for photographing a subject that moves faster than the subject in the first photographing mode; and
the setting unit sets a narrower shutter release enabled range in the second photographing mode than in the first photographing mode.

18. A camera according to claim 17, wherein:
the first photographing mode includes at least one of a normal photographing mode, a landscape photographing mode, a portrait photographing mode, a close-up photographing mode and a night photographing mode and the second photographing mode includes at least a sports photographing mode.

19. A camera according to claim 15, further comprising:
an aperture that is operated to adjust a quantity of subject light entering the image-capturing element, wherein:
an aperture value set at the aperture constitutes the photographing condition; and
the setting unit sets a wider shutter release enabled range as the aperture value increases.

20. A camera according to claim 15, further comprising:
a photometering unit that detects a brightness of a predetermined area of the subject, wherein:
the brightness detected by the photometering unit constitutes the photographing condition; and
the setting unit sets a wider shutter release enabled range as the brightness becomes lower.

21. A camera according to claim 15, wherein:
the image-capturing element includes a plurality of pixels;
a number of recording pixels to be used for recording in data of the image captured by the image-capturing element can be varied;
the number of recording pixels constitutes the photographing condition; and
the setting unit sets a wider shutter release enabled range as the number of recording pixels becomes smaller.

22. A camera according to claim 15, further comprising:
a detection unit that detects a full-aperture F value of the photographic lens; and
a setting unit that sets the shutter release enabled range in conformance to the full-aperture F value.

23. A camera according to claim 15, further comprising:
a timer that starts a time count upon completion of a predetermined camera operation, wherein:
the setting unit sets a narrower shutter release enabled range as a greater length of time is counted at the timer.

24. A camera comprising:
an image-capturing element that captures a subject image through a photographic lens;
an evaluation value calculation unit that calculates a focus evaluation value based upon an image-capturing signal output from the image-capturing element;
a focusing operation unit that performs a focusing operation at the photographic lens based upon the focus evaluation value;
a decision-making unit that makes a decision as to whether or not the focus evaluation value calculated after an end of the focusing operation is within a shutter release enabled range in which a photographing operation is enabled;
a shutter release enabling unit that enables the photographing operation in response to a photographing command if the decision-making unit decides that the focus evaluation value is within the shutter release enabled range; and
a photographing unit that executes the photographing operation if the photographing command is output while the photographing operation is enabled by the shutter release enabling unit.

25. A camera comprising:
an image-capturing element that captures a subject image through a photographic lens;
an evaluation value calculation unit that calculates a focus evaluation value based upon an image-capturing signal output from the image-capturing element;
a drive unit that moves the photographic lens along an optical axis;

a storage unit that individually stores a plurality of focus evaluation values calculated by the evaluation value calculation unit while the photographic lens is moved by the drive unit and lens positions assumed by the photographic lens when the plurality of focus evaluation values are calculated;

a focusing operation unit that performs a focusing operation by moving the photographic lens so as to achieve a maximum focus evaluation value;

a restart unit that restarts the focusing operation unit after focus is achieved by the focusing operation unit; and a distance setting unit that sets a distance to be traveled by the photographic lens for a restart of the focusing operation unit based upon the focus evaluation values and the lens positions stored in the storage unit and another focus evaluation value calculated at the restart.

* * * * *